(12) United States Patent
Pounds et al.

(10) Patent No.: US 11,343,323 B2
(45) Date of Patent: May 24, 2022

(54) AUGMENTED REALITY OBJECTS REGISTRY

(71) Applicant: Snap Inc., Santa Monica, CA (US)

(72) Inventors: Jennica Pounds, Bellevue, WA (US); Brent Mills, Seattle, WA (US); Ulf Oscar Michel Loenngren, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/731,821

(22) Filed: Dec. 31, 2019

(65) Prior Publication Data
US 2021/0203727 A1 Jul. 1, 2021

(51) Int. Cl.
| | | |
|---|---|---|
| *G06F 17/00* | (2019.01) | |
| *H04L 67/141* | (2022.01) | |
| *G06F 16/9537* | (2019.01) | |
| *G06F 16/29* | (2019.01) | |
| *H04L 67/01* | (2022.01) | |

(52) U.S. Cl.
CPC ............ *H04L 67/141* (2013.01); *G06F 16/29* (2019.01); *G06F 16/9537* (2019.01); *H04L 67/42* (2013.01)

(58) Field of Classification Search
None
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |

(Continued)

FOREIGN PATENT DOCUMENTS

| | | |
|---|---|---|
| CA | 2887596 A1 | 7/2015 |
| EP | 2051480 A1 | 4/2009 |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Natisha D Cox
(74) *Attorney, Agent, or Firm* — Schwegman Lundberg & Woessner, P.A.

(57) ABSTRACT

Various embodiments provide for a registry for augmented reality (AR) objects, which can provide AR objects to a client device to support various software or hardware applications. For instance, some embodiments provide for an AR object registry that facilitates or enables registration of one or more AR objects in association with one or more locations across a planet.

20 Claims, 15 Drawing Sheets

(56) References Cited

U.S. PATENT DOCUMENTS

| | | |
|---|---|---|
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Mauriile |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu |
| 8,276,092 B1 | 9/2012 | Narayanan |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi |
| 8,418,067 B2 | 4/2013 | Cheng |
| 8,423,409 B2 | 4/2013 | Rao |
| 8,471,914 B2 | 6/2013 | Sakiyama |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen |
| 8,560,612 B2 | 10/2013 | Kilmer et al. |
| 8,594,680 B2 | 11/2013 | Ledlie et al. |
| 8,613,089 B1 | 12/2013 | Holloway |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Airman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |

(56) References Cited

U.S. PATENT DOCUMENTS

| | | |
|---|---|---|
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,105,601 B1 * | 10/2018 | Hariton .................. G06F 3/147 |
| 10,698,562 B1 * | 6/2020 | Zhou ...................... G06T 15/08 |
| 10,789,474 B2 * | 9/2020 | Li .......................... G06K 9/325 |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0061901 A1 | 3/2009 | Arrasvuori et al. |

(56) References Cited

U.S. PATENT DOCUMENTS

| | | |
|---|---|---|
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand. et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabl |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |

(56) References Cited

U.S. PATENT DOCUMENTS

| | | |
|---|---|---|
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0178257 A1* | 7/2013 | Langseth ............ A63F 13/812 463/4 |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Shariti |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0128161 A1 | 5/2014 | Latta et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0254934 A1 | 9/2014 | Laxminarayana Bhat et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0032838 A1* | 1/2015 | Demsey ............ G06F 16/9574 709/213 |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0178990 A1* | 6/2015 | Ng-Thow-Hing ...... G06F 3/147 715/850 |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2016/0335289 A1 | 11/2016 | Andrews |
| 2017/0006094 A1 | 1/2017 | Abou Mahmoud et al. |
| 2017/0053621 A1 | 2/2017 | Chen et al. |
| 2017/0061308 A1 | 3/2017 | Chen et al. |
| 2017/0270713 A1 | 9/2017 | Dooley et al. |
| 2017/0287006 A1 | 10/2017 | Azmoodeh et al. |
| 2018/0350144 A1 | 12/2018 | Rathod |
| 2019/0126129 A1* | 5/2019 | Hariton ................ G06T 19/006 |
| 2019/0244436 A1 | 8/2019 | Stansell et al. |
| 2019/0354699 A1* | 11/2019 | Pekelny ................ G06F 21/32 |
| 2019/0371067 A1 | 12/2019 | Simari et al. |
| 2020/0067998 A1 | 2/2020 | Pilnock et al. |
| 2020/0128052 A1* | 4/2020 | McCormack .......... G06N 20/20 |
| 2020/0409161 A1* | 12/2020 | Cui .................... G06F 3/013 |
| 2021/0200776 A1 | 7/2021 | Pounds et al. |

FOREIGN PATENT DOCUMENTS

| | | |
|---|---|---|
| EP | 2151797 A1 | 2/2010 |
| EP | 3388929 A1 | 10/2018 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |

(56) References Cited

FOREIGN PATENT DOCUMENTS

| WO | WO-2007092668 A2 | 8/2007 |
|---|---|---|
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2021138161 A1 | 7/2021 |
| WO | WO-2021138225 A1 | 7/2021 |

OTHER PUBLICATIONS

"Adding photos to your listing", eBay, [Online] Retrieved from the Internet: <URL: http:/,pages.ebay.com/help/sell/pictures.html>, (accessed May 24, 2017), 4 pgs.
"U.S. Appl. No. 16/729,775, Non Final Office Action dated Apr. 21, 2021", 20 pgs.
"BlogStomp", StompSoftware, [Online] Retrieved from the internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell The Whole Story", [Online] Retrieved from the Internet: <URL: youtu.be/uF_gFkgihBMS, (Nov. 8, 2013), 113 pgs. , 1:02 min.
"International Application Serial No. PCT/US2015/037251, International Search Report dated Sep. 29, 2015", 2 pgs.
"International Application Serial No. PCT/US2020/066695, International Search Report dated Mar. 30, 2021", 5 pgs.
"International Application Serial No. PCT/US2020/066695, Written Opinion dated Mar. 30, 2021", 7 pgs.
"International Application Serial No. PCT/US2020/06708/, International Search Report dated Apr. 8, 2021", 4 pgs.
"International Application Serial No. PCT/US2020/067087, Written Opinion dated Apr. 8, 2021".
"Introducing Snapchat Stories", [Online] Retrieved from the Internet: <URL: https://web.archive.org/web/20131026084921/https://www.youtube.com/watch?v=88Cu3vN-LIM>, (Oct. 3, 2013), 92 pgs.; 00:47 min.
"Macy's Belleve-o-Magic", [Online] Retrieved from the Internet: <URL: https://web.archive.org/web/20190422101854/https://www.youtube.com/watch?v=xvzRXy3J 0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reaiity-Experience-Stores-Country>, (Nov. 2, 2011), 6 pgs.
"Starbucks Cup Magic", [Online] Retrieved from the Internet: <URL: https://www.youtube.com/watch?v=RWwQXI9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspiratlonroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily72011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
U.S. Appl. No. 16/729,775, filed Dec. 30, 2019, Surfacing Augmented Reality Objects.
"U.S. Appl. No. 16/729,775, Advisory Action dated Oct. 21, 2021", 3 pgs.
"U.S. Appl. No. 16/729,775, Examiner Interview Summary dated Jul. 26, 2021", 2 pgs.
"U.S. Appl. No. 16/729,775, Final Office Action dated Aug. 9, 2021", 23 pgs.
"U.S. Appl. No. 16/729,775, Response filed Jul. 21, 2021 to Non Final Office Action dated Apr. 21, 2021", 11 pgs.
"U.S. Appl. No. 16/729,775, Response filed Oct. 12, 2021 to Final Office Action dated Aug. 9, 2021", 12 pgs.
"U.S. Appl. No. 16/729,775, Non Final Office Action dated Jan. 7, 2022", 25 pgs.

\* cited by examiner

AUGMENTED REALITY (AR) OBJECT SYSTEM WITH AR OBJECT REGISTRY 116

DATA LAYERS 210

THREE-DIMENSIONAL (3D) TOPOLOGICAL DATA LAYER 212

LOGICAL TOPOLOGICAL DATA LAYER 214

USER DATA LAYER 216

AUGMENTED REALITY (AR) OBJECT MODEL DATA LAYER 218

AUGMENTED REALITY (AR) OBJECT SERVICES 230

AUGMENTED REALITY (AR) OBJECT INTERACTIVE SESSION SERVICE 232

AUGMENTED REALITY (AR) OBJECT QUERY SERVICE 234

AUGMENTED REALITY (AR) OBJECT REGISTRY SERVICE 236

*FIG. 2*

AUGMENTED REALITY OBJECTS REGISTRY

TECHNICAL FIELD

Embodiments described herein relate to augmented reality and, more particularly, but not by way of limitation, to systems, methods, devices, and instructions for a registry for augmented reality objects, which can support mixed reality.

BACKGROUND

Presently, geospatial databases can be used to provide three-dimensional (3D) geospatial maps of the world to mobile devices. Typically, a mobile device, such as a smartphone, use a Global Position System (GPS) to canonically associate the mobile device with a coordinate position on Earth, and the coordinate position can be used to query the geospatial database for 3D map data. For instance, given a central point relative to the coordinate position of the mobile device, a geospatial data base can be queried to obtain all data for 3D map objects within a particular radius of the central point, or to obtain the data for the 3D map objects closest to the central point.

BRIEF DESCRIPTION OF THE DRAWINGS

Various ones of the appended drawings merely illustrate some embodiments of the present disclosure and should not be considered as limiting its scope. The drawings are not necessarily drawn to scale. To easily identify the discussion of any particular element or act, the most significant digit or digits in a reference number refer to the figure number in which that element is first introduced, and like numerals may describe similar components in different views.

FIG. 2 is block diagram illustrating an example logical architecture for an AR object system, according to some embodiments.

DETAILED DESCRIPTION

Figure 1:
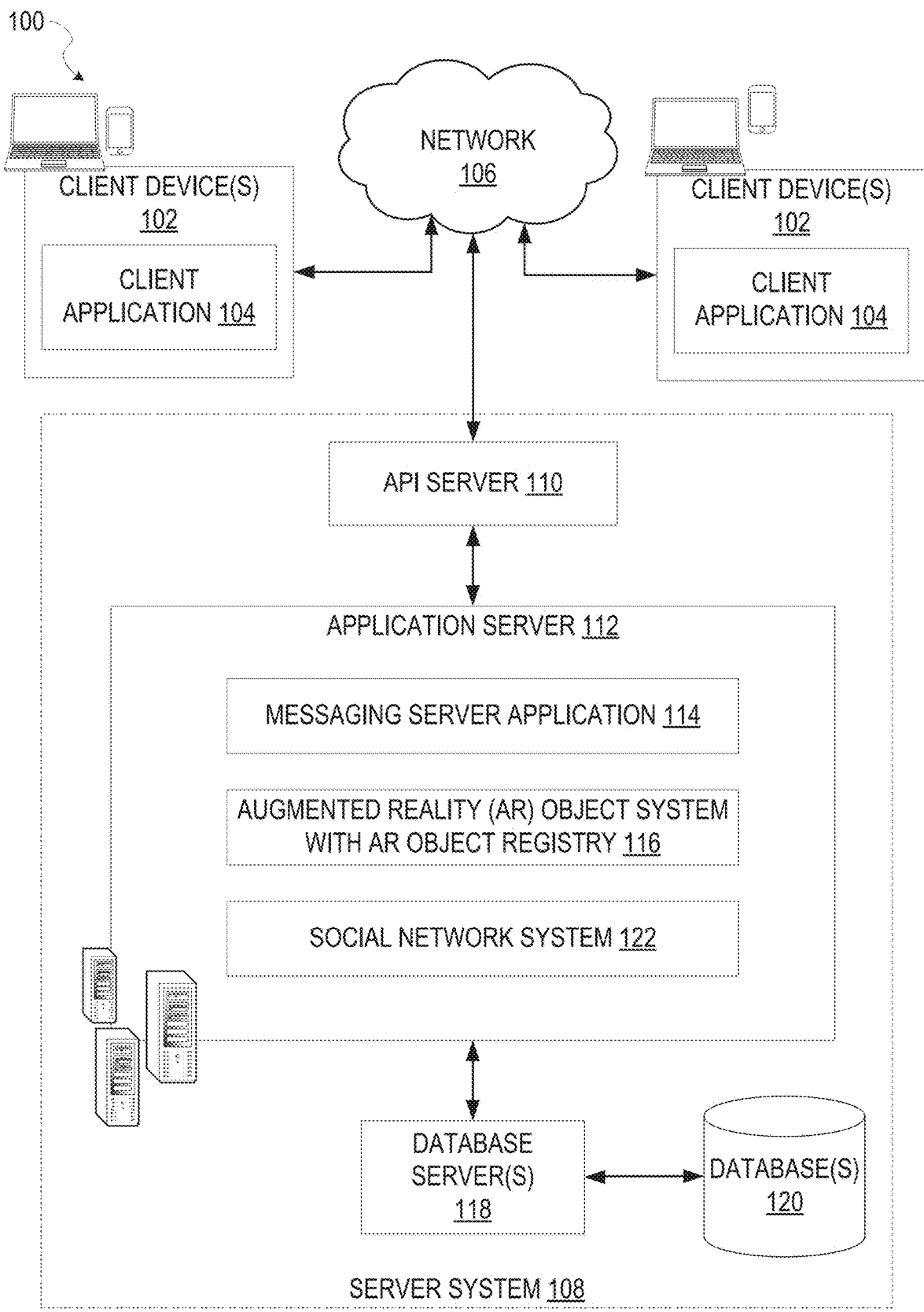
FIG. 1 is a block diagram showing an example system, for exchanging data (e.g., relating to AR objects) over a network, that can include an augmented reality (AR) object system, according to some embodiments.

Various embodiments provide systems, methods, devices, and instructions for a registry for augmented reality objects, which can provide augmented reality objects to a client device to support various software or hardware applications (e.g., mixed reality software applications). For instance, some embodiments provide for an augmented reality (AR) object registry that facilitates or enables registration of one or more AR objects in association with one or more locations across a planet (e.g., on a world scale). For instance, an AR object registry can enable associations between one or more AR objects and one or more locations or physical objects on planet Earth. In doing so, such an AR object registry can permit a user to use their client device to explore AR objects anywhere on Earth. Additionally, an AR object registry described herein can also support or enable, for example, implementation of a spatial-based (e.g., augmented reality-based) world wide web.

The architecture of some embodiments described herein permits scaling to service AR object registration in connection with locations across Earth, and permits scaling to provide or support interactive sessions that enable multiple users (e.g., large numbers of users) across the world to interact together with registered AR objects. For some embodiments, an AR registry of an embodiment can associate (e.g., unite) topology map data (e.g., of Earth) with AR object data such that the real-world information is brought into a virtual model, which enables the scalability of the AR registry. Additionally, some embodiments implement one or more rankers or ranker mechanisms (e.g., ranker algorithm) to determine (e.g., by filtering or sorting) which AR objects are provided to a client device (e.g., in response to a request/query for AR objects from the client device). In this way, such embodiments can affect which AR objects are displayed or surfaced by the client device at and around the client device's current set of coordinates on a map (e.g., geospatial map).

Unlike conventional technologies (e.g., traditional geospatial databases), the AR registry of various embodiments can better support user interaction with registered AR objects. Additionally, unlike conventional technologies, the AR registry of various embodiments does not need to rely on strict (e.g., tight) geofencing to provide AR objects to client devices.

As used herein, an AR object can comprise a virtual object that can be presented in a client device-generated view of a real-world environment (e.g., a view presented on a display of a mobile client device), where the virtual object can interact with or enhance a real-world physical object of the real-world environment presented in the view. For instance, an AR object can be combined with a live (e.g., real-time or near real-time) camera feed such that when the AR object is presented, it appears situated in the live a three-dimensional environment (e.g., AR object appears to occupy a consistent three-dimensional volume and dynamically changing in aspect responsive to movement of the camera in a manner similar to that which would have been the case were the AR object a real-world physical object). A registered AR object can comprise an AR object registered by an embodiment described herein, thereby associating the AR object with a set of coordinates via an AR object registry. The level of interaction (e.g., user interaction) available for an AR object registered by an embodiment can vary. For example, an AR object can be static and have no level of interaction with a user or the real-world environment. A registered AR object (e.g., virtual ball) can have one or more available interactions (e.g., spin, bounce, toss, etc.) where any changes to the state of the AR object (by way of those available interactions) are localized (e.g., confined or limited) to the user at the client device (e.g., state changes to the AR object are not propagated to another user at another client device) and any changes to the state of the AR object do not alter the current initial state of the AR object as stored in the AR object registry. A registered AR object (e.g., virtual graffiti) can have one or more available interactions (e.g., drawing, generating, or applying the virtual graffiti) where any changes to the state of the AR object (by way of those available interactions) are propagated to another user at another client device (e.g., be presented in a view displayed by the other client device) without interaction by the other user (i.e., no interactive session needed). Additionally, a registered AR object can permit two or more users to interact (e.g., in real-time) with the registered AR object (e.g., spin, bounce, or toss the virtual ball) at the same time during an interactive session. For example, a first user can toss a virtual ball between one or more other users within the same interactive session, where data is transmitted between the user's client device through the interactive session. Depending on the registered AR object, at the end of the interactive session, the final state of the registered AR object (as changed by users' interactions during the interactive session) may or may not be saved to the AR object registry, thereby updating the initial state of the AR object for subsequent single-user interactions or multi-user interactive sessions.

For some embodiments, a registration of an AR object or a ranker can be ephemeral (e.g., accessible for only a duration of time after first being accessed). The ephemeral nature of a registration can create a need for a user to re-register an AR object or a ranker periodically (e.g., every 24 hours), which can deter or prevent registration abuses (e.g., spamming).

For some embodiments, user interactions with respect to a given AR object can be defined by a set of rules (e.g., interaction rules) associated with the AR object. For instance, a rule for an AR object can determine an availability of an interaction with respect to the AR object (e.g., can toss or bounce virtual ball), or can define an interaction constraint with respect to the AR object (e.g., interactions with respect to the virtual ball are limited to the client, or the virtual ball can only be tossed so far).

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example system 100, for exchanging data (e.g., relating to AR objects) over a network 106, that can include an augmented reality (AR) object system, according to some embodiments. The system 100 includes multiple client devices 102, each of which hosts a number of applications including a client application 104. Each client application 104 is communicatively coupled to other instances of the client application 104 and a server system 108 via a network 106 (e.g., the Internet).

Accordingly, each client application 104 can communicate and exchange data with another client application 104 and with the server system 108 via the network 106. The data exchanged between client applications 104, and between a client application 104 and the server system 108, includes functions (e.g., commands to invoke functions) as well as payload data (e.g., AR object, text, audio, video or other multimedia data).

For some embodiments, a particular client application 104 provides its respective client device 102 with one or more augmented reality/mixed reality features. A particular client application 104 can represent, for example, an augmented reality (AR) client software application, or a messaging software application that includes augmented reality/mixed reality features. A particular client application 104 can obtain one or more AR objects (e.g., from an augmented reality (AR) object system with AR object system 116, hereafter the AR object system 116) to generate a mixed reality environment (e.g., based on the real-world environment of the client device 102) that includes the one or more AR objects. For instance, a particular client application 104 can enable a client device 102, such as a smartphone, to capture image frames of a real-world environment (e.g., using smartphone camera) and generate a view (e.g., on the smartphone display) that presents the real-world environment with (e.g., enhanced by) one or more AR objects that are associated with that real-world environment. In particular, a particular client application 104 can obtain AR objects from an AR registry (e.g., implemented by the AR object system 116) by, for example, requesting or querying for one or more AR objects from the AR object system 116 using information associated with the client device 102, such as information regarding the user of the client device 102, the current set of coordinates (e.g., GPS coordinates) of the client device 102, or a specified radius around the client device 102. When obtaining the one or more AR objects (e.g., the AR object system 116), a particular client application 104 can receive data for those AR objects. The data for those AR objects can include, for example: model data for one or more three-dimensional models (e.g., 3D graphical content) for rendering and displaying the obtained AR objects on a client device 102; rule data describing one or more rules that determine user interactions with the obtained AR objects through a particular client application 104; or state data describing initial states of the obtained AR objects (e.g., initial state in which an obtained AR object will be presented by a particular client application 104 on a client device 102).

With respect to usage of an obtained AR object, a particular client application 104 can display the obtained AR object on the display of a client device 102 by determining a positioning of the AR object on the display relative to the real-world environment. A particular client application 104 can do so by executing a process that generates (or constructs) a virtual camera by combining data from a client devices 102's various sensors, such as an image sensor, inertial measurement unit (IMU), and GPS sensor, and then using the virtual camera to position the obtained AR object on the display of the client device 102. A particular client application 104 can, for example, use a simultaneous localization and mapping (SLAM) or visual odometry (VIO) system or method to generate the virtual camera. When a particular client application 104 displays the AR object, the 3D model of AR object can be rendered and displayed as an overlay over the real-world environment being presented by a client device 102.

For some embodiments, a particular client application 104 enables a user to register one or more AR objects with an AR registry (e.g., implemented by the AR object system 116) in association with a set of coordinates on a map (e.g., geospatial map).

The server system 108 provides server-side functionality via the network 106 to a particular client application 104. While certain functions of the system 100 are described herein as being performed by either a client application 104 or by the server system 108, it will be appreciated that the location of certain functionality either within the client application 104, the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. This data may include message content, AR object-related information (e.g., model data, orientation, interaction rules or logic, state information, interactive, session information, etc.), client device information, geolocation information, media annotation and overlays, message content persistence conditions, social network information, and live event information as examples. Data exchanges within the system 100 can be invoked and controlled through functions available via user interfaces (UIs) of the client application 104.

Turning now specifically to the server system 108, an Application Program Interface (API) server 110 is coupled to, and provides a programmatic interface to, an application server 112. The application server 112 is communicatively coupled to a database server 118, which facilitates access to a database 120 in which is stored data associated with operations performed by the application server 112.

Dealing specifically with the Application Program Interface (API) server 110, this server receives and transmits message data (e.g., commands and message payloads) between the client device 102 and the application server 112. Specifically, the API server 110 provides a set of interfaces (e.g., routines and protocols) that can be called or queried by the client application 104 in order to invoke functionality of the application server 112. The API server 110 exposes various functions supported by the application server 112, including for example: account registration; login functionality; the sending of AR object-related information (e.g., model data, orientation, interaction rules or logic, state information, interactive, session information, etc.) via the application server 112, from the AR object system 116 to a particular client application 104; the sending of AR object-related information (e.g., query or request information, user input information, state information, model data for a new AR object, etc.) via the application server 112, from a particular client application 104 to the AR object system 116; the sending of messages, via the application server 112, from a particular client application 104 to another client application 104; the sending of media files (e.g., digital images or video) from a client application 104 to the messaging server application 114, and for possible access by another client application 104; the setting of a collection of media content items (e.g., story), the retrieval of a list of friends of a user of a client device 102; the retrieval of such collections; the retrieval of messages and content, the adding and deletion of friends to a social graph; the location of friends within a social graph; and opening an application event (e.g., relating to the client application 104).

The application server 112 hosts a number of applications, systems, and subsystems, including a messaging server application 114, an AR object system 116, and a social network system 122. The messaging server application 114 implements a number of message processing technologies and functions, particularly related to the aggregation and other processing of media content items (e.g., textual and multimedia content items) included in messages received from multiple instances of the client application 104. As will be described herein, media content items from multiple sources may be aggregated into collections of media content items (e.g., stories or galleries), which may be automatically annotated by various embodiments described herein. For example, the collections of media content items can be annotated by associating the collections with captions, geographic locations, categories, events, highlight media content items, and the like. The collections of media content items can be made available for access, by the messaging server application 114, to the client application 104. Other processor- and memory-intensive processing of data may also be performed server-side by the messaging server application 114, in view of the hardware requirements for such processing.

For a given a collection of media content, one or more annotations of the given collection may represent features of the given collection, and those features may include one or more graphical elements (e.g., emojis or emoticons) that various embodiments described herein may be use when automatically associating one or more graphical elements with the given collection. Access to the given collection of media content items may include access to one or more of annotations of the given collection and one or more graphical elements associated with the given collection by various embodiments described herein.

As shown, the application server 112 also includes the AR object system 116, which implements one or more aspects of various embodiments described herein, such as an AR registry and ranker-based AR querying. More regarding the AR object system 116 is described herein with respect to FIG. 2.

The social network system 122 supports various social networking functions and services, and makes these functions and services available to the messaging server application 114 and the AR object system 116. To this end, the social network system 122 maintains and accesses an entity graph within the database 120. Examples of functions and services supported by the social network system 122 include the identification of other users of the system 100 with which a particular user has relationships or is "following", and also the identification of other entities and interests of a particular user.

The application server 112 is communicatively coupled to a database server 118, which facilitates access to a database 120 in which is stored data associated with operations performed by the messaging server application 114 or the AR object system 116.

FIG. 2 is block diagram illustrating an example logical architecture for the AR object system 116, according to some embodiments. Specifically, the AR object system 116 is shown to comprise data layers 210 and augmented reality (AR) object services 230, which support various features and functionalities of the AR object system 116. As shown, the data layers 210 comprises a three-dimensional (3D) topological data layer 212, a logical topological data layer 214, a user data layer 216, and an augmented reality (AR) object model data layer 218. As also shown, the AR object services 230 comprises an augmented reality (AR) object interactive session service 232, an augmented reality (AR) object query service 234, and an augmented reality (AR) object registry service 236. For various embodiments, the components and arrangement of components of the AR object system 116 may vary from what is illustrated in FIG. 2. Any components of the AR object system 116 can be implemented using one or more processors (e.g., by configuring such one or more computer processors to perform functions described for that component) and hence can include one or more of the processors. Furthermore, according to various embodiments, any of the components illustrated in FIG. 2 can be implemented together or separately within a single machine, database, or device or may be distributed across multiple machines, databases, or devices. For example, the data layers 210 can be implemented by one or more databases (e.g., databases 120), and the AR object services 230 can be implemented by one or more servers (e.g., the application server 112).

The 3D topological data layer 212 comprises data that describes an internal representation of a real-world environment. The data can include, without limitation, 3D modeling information of the real-world environment and information that associates the 3D modeling information with one or more coordinates (e.g., on a topological map). A query to the 3D topological data layer 212 cam comprise one or more coordinates on a map (e.g., topological map) and a radius value around a point corresponding to the one or more coordinates. The query results provided by the 3D topological data layer 212 can comprise one or more 3D model objects that fall within the radius that is centered at the one or more coordinates. Data for the 3D topological data layer 212 can be sourced from one or more data sources, including third party vendors. Additionally, data of the 3D topological data layer 212 can be divided into two or more types, such as lower resolution data (hereafter, referred to as world data) and higher resolution data (hereafter, referred to as deep world data. World data can represent default ground truth data for the AR object system 116 (which can provide a quick foundation for AR object model placement). In comparison to deep world data, world data can have lower accuracy (e.g., approximately 3 m of accuracy), and generally lacks indoor data for real world structures (e.g., buildings, etc.). Deep world data can represent the 3D topological data having the highest accuracy within the AR object system 116 (e.g., centimeter level of accuracy), and can include indoor data for real world structures.

The logical topological data layer 214 comprises data that relates to logic (e.g., business or operational logic) that can be applied to data provided by the 3D topological data layer 212. At least portion of the data provided by the logical topological data layer 214 can be stored in geospatial vector type format. Two types of data provided by the logical topological data layer 214 can include zone data and geolocation data.

According to some embodiments, zone data (of the logical topological data layer 214) marks or identifies one or more areas in a real-world environment, and can further associate one or more attribute values to those one or more areas. For instance, zone data can mark/identify areas of a real-world environment according to one or more of the following: state lines, county lines, city limits, parcel traits, or zoning areas. These marked/identified areas may also be referred to or regarded as zones. Within zone data, an area of a real-world environment can be defined by a non-scalar polygon data type. For some embodiments, zone data facilitates geo-partitioning of a large real-world environment (e.g., the Earth), which can support assignment and management of interactive sessions and session-related computing resources (e.g., session servers) by the AR object interactive session service 232 as described herein.

For some embodiments, zone data marks or identifies one or more permissions for a given area (e.g., as one or more attribute values of the given area). The permissions (embodied as permission data) for a given area can enable the AR object system 116 (e.g., the AR object registry service 236 thereof) to determine, for example, whether a given user can register (e.g., place) an AR object (e.g., new AR object or an existing AR object) of their choosing at location corresponding to a set of coordinates on a map (e.g. topological map). In this way, zone data of some embodiments can associate a particular real-world space with one or more permissions that can deter an abuse of the AR object system 116. For instance, permission data (provided by zone data) can prevent a first user representing a first business (e.g., pizza shop #1) from registering an AR object (e.g., AR object representing a coupon for the first business) at a location corresponding with a second business that is a competitor of the first business (e.g., pizza shop #2). On the other hand, the same permission data can permit a second user that is confirmed to be the owner of the second business to registering an AR object of their choosing at the location corresponding with the second business. In similar manner, one or more permissions provided by zone data can control registration of AR objects with respect to locations corresponding to private residences.

Additionally, one or more permissions provided by zone data for a given area can enable the AR object system 116 (e.g., the AR object registry service 236 thereof) to determine whether a given user can register (e.g., associate) a ranker with respect to a location corresponding to a set of coordinates on a map (e.g. topological map). As described herein, a ranker can determine which AR objects are provided (e.g., surfaced) to a client device in response to a request or query from the client device for AR objects.

The following Table 1 can represent an example structure of a database table used to store zone data of the logical topological data layer 214.

TABLE 1

| Column Name | Data Type | Brief Description |
| --- | --- | --- |
| zone_id | Long number, (serving as a primary key) | Unique ID identifying a marked area of real-world environment. |
| user_id | Long number (serving as a foreign key) | ID for user (corresponding to a user_id in table of User Data Layer) associated as an owner of this marked area. |
| zone_geometry | GeoJSON polygon | Describes the marked area as a real-world region (e.g., a property parcel). |
| permission_id | Enumeration | Describes one or more permissions associated with the marked area. |

According to some embodiments, geolocation data (of the logical topological data layer 214) comprises data for storing registration of an AR object in association with one or more coordinates corresponding to a location on a map (e.g., topological map), storing registration of a ranker in association one or more coordinates corresponding to a location on a map, or some combination of both. In particular, for some embodiments, the geolocation data can associate data from 3D topological data layer 212 (e.g., such as geospatial data) with model data from the AR object model data layer 218. In this way, the geolocation data can facilitate registration (e.g., placement) of an AR object in association with a set of coordinates corresponding to a location on a map. For some embodiments, the geolocation data associates a center (e.g., centeroid) of an AR object with the set of coordinates. The center of an AR object can correspond to a center of the AR object's 3D bounding box. When the AR object is ultimately displayed by a client device, the AR object's displayed position and orientation can be determined relative to the center of the AR object. Additionally, for various embodiments, the geolocation data facilitates registration of a ranker in association with a set of coordinates corresponding to a location on a map by associate data from 3D topological data layer 212 (e.g., such as geospatial data) with an identifier associated with a ranker.

Depending on the embodiment, the geolocation data can be implemented as a join table of a database. The following Table 2 can represent an example structure of a database table used to store geolocation data of the logical topological data layer 214.

TABLE 2

| Column Name | Data Type | Brief Description |
| --- | --- | --- |
| position_id | Long number, (serving as a primary key) | Unique ID identifying the association of position of the AR object with a set of coordinates correspond to a location on a map (described by data from 3D Topological Data Layer). |
| model_id | Long number (serving as a foreign key) | ID for model data of AR object corresponding to a model_id in table of Model Data Layer. |
| ranker_id | Long number (serving as a foreign key) | ID for a ranker associated with this position. |
| location_data | (latitude longitude, altitude) | One or more coordinates that determine where the AR object's centroid will be positioned. |
| orientation_data | (yaw, pitch, roll) | Used to determine the rotation of the AR object relative to its centroid. |
| expiry_time | Timestamp | Time at which this registered association (of position of the AR object with a set of coordinates correspond to a location on a map) will expire, which can be used to implement an ephemeral AR object. |

The user data layer 216 comprises data associated with a user of the AR object system 116. The data provided by user data layer 216 can include, without limitation, data about which AR objects a given user owns or controls, data about the last state of a given AR object with respect to a given user, or data regarding one or more sessions associated with a given user. The following Table 3 can represent an example structure of a database table used to store user data of the user data layer 216

TABLE 3

| Column Name | Data Type | Brief Description |
| --- | --- | --- |
| user_id | Long number, (serving as a primary key) | Unique ID identifying a user of the AR object system described herein. |

TABLE 3-continued

| Column Name | Data Type | Brief Description |
| --- | --- | --- |
| user_name | Text | Username for the user associated with the user_id. |
| timestamp | Timestamp | Time at which this user record was created or updated. |

The following Table 4 can represent an example structure of a database table used to store data of the user data layer 216 for looking up user ownership/control of an AR object.

TABLE 4

| Column Name | Data Type | Brief Description |
| --- | --- | --- |
| user_id | Long number (serving as a foreign key) | ID for user (corresponding to a user_id in table of User Data Layer) associated as an owner of an AR object model identified by model_id |
| model_id | Long number (serving as a foreign key) | ID for model data of AR object (corresponding to a model_id in table of Model Data Layer). |

The AR object model data layer 218 comprises data for one or more AR objects that can potentially be registered with the AR object system 116.

Data stored by the AR object model data layer 218 can include, without limitation, model data for generating (e.g., rendering) a 3D model that visually represents a given AR object, data describing a (e.g., precalculated) 3D bounding box for a given AR object and rule data describe one or more rules for interacting with a given AR object. As described herein, a center of a 3D bounding box associated with a given AR object can determine how the given AR object is positioned and oriented when displayed by a client device with respect to a real-world environment (e.g., how the given AR object is embedded in real-world space presented by the client device). Additionally, as described herein, one or more rules associated with a given AR object can determine a level of user interaction available with respect to the given AR object. For instance, one or more rules of a given AR object can determine whether the AR object is static, has interactions limited to the client device, or allows multiuser interaction over through an interactive session.

Depending on the embodiment, the AR object model data layer 218 can be implemented as a data structure that implements a key-value store. The following Table 5 can represent an example structure of a database table used to store data of the AR object model data layer 218.

TABLE 5

| Column Name | Data Type | Brief Description |
| --- | --- | --- |
| model_id | Long number, (serving as a primary key) | Unique ID associated with model data of AR object. |
| model_data | Binary bytes | Data blob used by a client device to render the 3D model of the AR object. |
| user_id | Long, foreign key into user_table | ID for user (corresponding to a user_id in table of User Data Layer) associated as an owner of this marked area. |

The AR object interactive session service 232 facilitates or manages the operation of an interactive session (hereafter, session) that enables multiuser interaction with respect to one or more registered AR objects (e.g., group of AR objects). As described herein, through a session, interaction data can be communicated between client devices of users that are jointly interacting with one or more AR objects. For some embodiments, the AR object interactive session service 232 assigns a user to a session when the user requests interaction with one or more given AR objects, where the assigned session is to handle the user's interactions with respect to the one or more given AR objects. Additionally, for some embodiments, the AR object interactive session service 232 assigns a user to a session when the user requests for a plurality of users to interact together (i.e., request multiuser interaction) with respect to one or more given AR objects. Depending on the embodiment, the AR object interactive session service 232 can assign users to a given session (e.g., fill the given sessions with users) using different approaches, such preferential assignment to users that are friends, or assignment on a first-come, first-serve basis.

In response to a request from a client device of a user to participate in a session to interact (e.g., facilitate multiuser interaction) with a set of AR objects, the AR object interactive session service 232 can assign the user to an existing session (e.g., one already operating on a session server) that can service the request, or generate and assign the user to a new session (e.g., spin up a new session on a session server) to service the request. More regarding session assignment and operation of sessions using mapping servers (e.g., world servers) and session servers is described herein with respect to FIGS. 3 and 4.

For some embodiments, a user is limited to participation in one session at a time. A user participating in a given session can idle out of the given session (e.g., based on lack of activity or interaction within the session after a period of time). Further, a given session can be assigned a user participant count limit to ensure that the given session operates as expected for participating users. The user participant count limit can vary between different sessions. For instance, the user participant count limit can be based on the geographic area/partition being serviced by the different sessions (e.g., area around a landmark, such as the Washington Monument, can likely involve more user AR object interactions and thus have a lower count limit than an area covering a small city park).

For some embodiments, the client device of each user participating in a given session shares data regarding that user's participation in the given session with the client devices of all other users participating in the given session. The data can include, without limitation, the user's inputs (e.g., swipes, head tilts, etc.) to the given session and changes to the state of an AR object involved in the given session caused by interactions of the user. For various embodiments, the sharing of data between the client device is facilitated through operations of the given session.

The state of an AR object involved in a session can be referred to as the AR object's session state. The current session state of an AR object of a session can serve as a "ground truth" for users interacting with the AR object through the session. With respect to a given session that is interacting with one or more given AR objects, the client device of user participating in (e.g., assigned to and involved in) the given session can receive the start state of each of those given AR objects at the start of the user's participation in the session, which the client device uses to initialize the session state of each of those given AR objects at the client device. The user can then participate in the session by, for example, interacting with one or more of the given AR objects, or user observing another user of the session interacting with one or more of the given AR objects. As the user participates in the given session, the user's client device can locally work with and maintain (e.g., store and update) a local copy of a session state for each of the given AR objects at the client device. For example, the client device can update the locally maintained session state of a first AR object of the given session based on the user interactions with the first AR object. Concurrently, the client device can update the locally maintained session state of the first AR object of the given session based on session state update data received by the client device regarding interactions with the first AR object by another user participating in the given session (e.g., session state update data being broadcasted, by the other user's client device, through the given session to all user client devices). Depending interaction level of a given AR object (e.g., as defined by a rule associated with the given AR object), at the termination of the given session, the final session state of the given AR object can be stored (e.g., persistently stored) to the AR object system 116 (e.g., stored to the user data layer 216 with respect to the users of the given session or stored for all users via the AR object model data layer 218). For instance, a rule of the given AR object can define that the given AR object can be interacted with through a session and any changes to the session state of the given AR object will eventually be saved to the AR object system 116. Once this final session state is stored to the AR object system 116, the stored session state can be used as initial/start state for the given AR object the next time one or more users start interacting with the given AR object again (e.g., within a new session). By maintaining local copies of session states at client devices and saving the final state of a given AR object (where applicable) at the end of a session, various embodiments can enable scalability of, can also promote stability of, and reduce or can avoid/reduce overwrite thrash by the AR object interactive session service 232.

The AR object interactive session service 232 can support multiple simultaneous sessions involving interaction of the same AR object. The sessions supported by the AR object interactive session service 232 can operate independently. Accordingly, with respect to a given AR object of a given session, access to the state of the given AR object within the given session (the given AR object's session state) can be maintained such that the session state cannot be accessed outside of the given session (e.g., by a user not participating in the given session). This means that two independent simultaneous sessions can involve users interacting with the same particular AR object, but each of those independent simultaneous sessions maintains its own session state for that particular AR object. The independence of sessions can enable some embodiments to manage (e.g., generate, assign, and operate) sessions using a mapping server and multiple session servers (e.g., independent sessions servers responsible for servicing sessions based on geopartitioning of the real-world) as described herein, which can provide scalability and stability for users. For instance, an independent session approach means that an embodiment can provide one or more users (within a single session) with the experience of seeing an AR object a user of the single session created with respect to a real-world object (e.g., placing a virtual hate on a real-world statue) for a satisfactory amount of time (rather than less than a small amount time, which would result if all users were interacting with the given AR object operated assigned to the same session or a session state of the given AR object was shared across multiple sessions). Where two or more simultaneous sessions involve one or more same AR objects, a merge rule functionality can be used to merge the final sessions states of those same AR objects if they are to be stored after termination of the simultaneous sessions.

Figure 3:
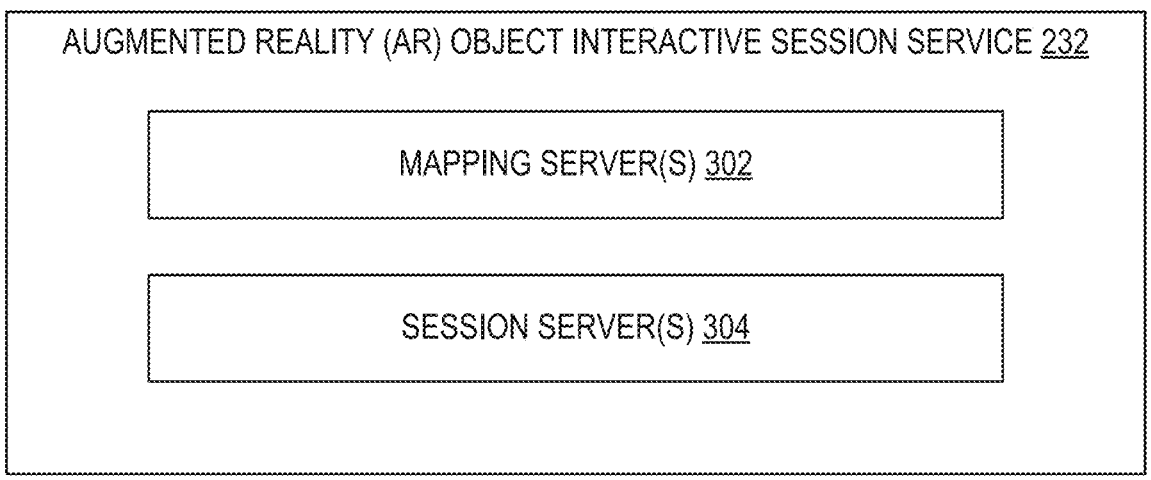
FIG. 3 is a block diagram illustrating an example of an AR object interactive session service, according to some embodiments.
Figure 4:
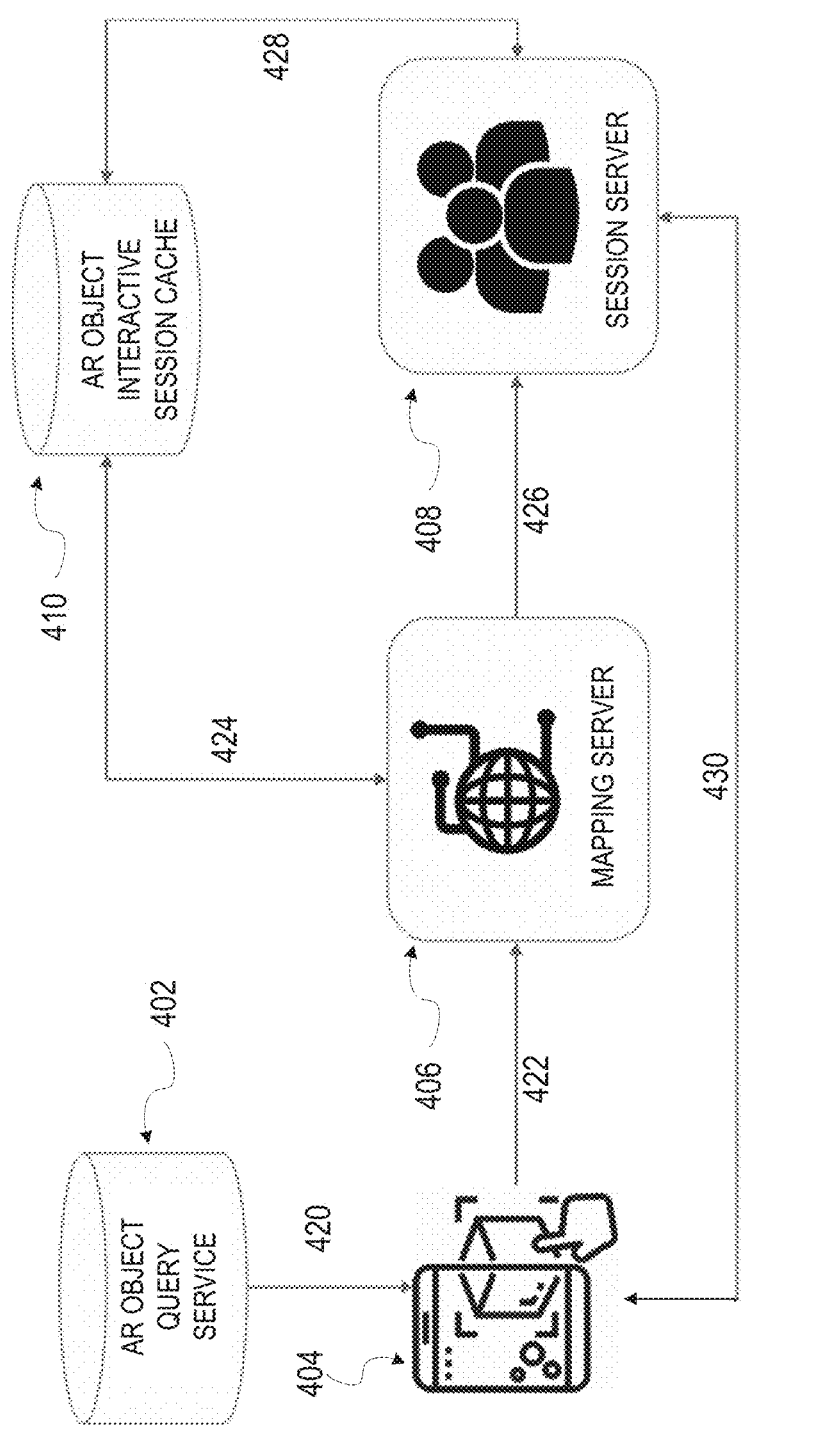
FIG. 4 is a flow diagram illustrate an example of session handling by an AR object interactive session service, according to some embodiments.

More regarding operations of the AR object interactive session service 232 are described herein with respect to FIGS. 3 and 4.

The AR object query service 234 processes requests or queries, from client devices, for one or more AR objects from the AR registry implemented by the AR object system 116 (e.g., implemented via geolocation data of the logical topological data layer 214). Based on a received request/query, the AR object query service 234 can determine one or more AR objects (from the AR registry) to be sent back to a client device for use. In this way, the AR object query service 234 operates as an AR object surface service, given that one or more AR objects provided by the AR object query service 234 to a client device (e.g., based on a client request or query) causes (or likely causes) the client device to present or surface those one or more AR objects on the client device. The request/query to the AR object query service 234 can be generated by a client application (e.g., 104) on a client device, where the client application can use one or more AR objects provided by the AR object query service 234 to present with respect to a view of a real-world environment (e.g., to provide a mixed reality user experience). As described herein, the request/query can include information associated with a client device, such as such as information regarding the user of the client device, the current set of coordinates (e.g., GPS coordinates) of the client device, or a specified radius around the client device.

For some embodiments, the AR object query service 234 uses one or more rankers in determining which one or more AR objects are to be sent back to a client device in response to a request/query. By a ranker, the AR object query service 234 can prioritize, filter, or sort AR objects to determining a final set of AR objects sent to the client device. For example, the AR object query service 234 can determine (e.g., identify) an intermediate/initial set of AR objects from the AR registry based on the client request/query, and then use a ranker to filter and sort the intermediate/initial set of AR objects to determine a final set of AR objects to be sent to the client device. Alternatively, the ranker can receive the client request/query and generate a ranker-based query that includes one or more parameters for prioritizing, filtering, or sorting the AR objects the results provided in response to the ranker-based query. The filter, sort, or both can be performed, for example, on attributes associated with geolocation data from the logical topological data layer 214.

A ranker can be implemented such that it can be horizontally scalable. Depending on the embodiment, the AR object query service 234 can have one or more rankers available for use. The AR object query service 234 can select and use one or more rankers (from a plurality of available rankers) based on a number of factors including, for example, based on information provided in the client request/query (e.g., client device geographical location or specific radius) or a user selection or preference. As described herein, the AR object registry service 236 can facilitate registration of new or existing rankers with the AR object system 116, thereby enabling availability of those new/existing rankers for use by the AR object query service 234. An example ranker can include a query result limit (e.g., limit to 25 AR objects). Another example ranker can include an algorithm that selects AR objects based on a pseudo-random fairness and then sorts the selected AR objects.

For some embodiments, the AR object query service 234 can use a ranker that accesses bidding data (e.g., provided by a bidding system) to determine priorities of a set of AR objects, which can enable the AR object query service 234 to filter the set of AR objects based on the determined priorities. For example, with respect to a set of AR objects falling within a specific radius centered at a location corresponding to a location of a client device, a ranker can access (e.g., real-time) bidding data for one or more AR objects (in the set of AR objects), which can determine the priority of those one or more AR objects. Bidding data can be accessed for each AR object by performing a monetization lookup on each AR object.

The bidding data can be provided by a bidding system, which can be separate or part of the AR object system 116. Where separate, the bidding system can have at least read access to data of the AR object system 116, such as the geolocation data of the logical topological data layer 214, which can facilitate bidding on registration/placement of AR objects.

Some embodiments provide for or utilize a bidding system, that permits one or more users (e.g., representing third-party organizations) to bid on prioritizing (surfacing of) an AR object of their choosing over other AR objects. The one or more users can bid, for example, that an AR object of their choosing be prioritized (e.g., boosted in priority) in association with a set of coordinates, areas relative to (e.g., around) a set of coordinates, a marked area (e.g., described by zone data from the logical topological data layer 214), with respect to certain users or types of users, and the like. For example, with respect to a registered AR object (an AR object registered in association with a set of coordinates corresponding to a location on a map), a user can bid on boosting the priority of the registered AR object, (e.g., over other AR objects registered/placed with respect to locations at or around the same set of coordinates). By boosting the priority of the registered AR object via a winning bid, a user can effectively boost the display/presentation/surfacing rank of the registered AR on a client device. For instance, based on a ranker associated with bidding data, the request/query result provided to a client device can include a predetermined number of top bidded AR objects. The bid can comprise a value (e.g., monetary value or virtual credit) being offered by the bid, and can further comprise a priority value being requested by the bid (e.g., amount of priority boost or actual priority value). On the bidding system, a bid can comprise a user associating a monetary value/virtual credit with a geolocation data record (e.g., postion_id corresponding to the record) of the logical topological data layer 214.

By use of a ranker can enable the AR object system 116 to decentralize the ability to query the AR registry for AR objects. Additionally, use of a ranker can improve user experience by improving which AR objects are presented/surfaced to a user at a client device. For example, through use of a ranker, the AR object query service 234 can enable a user to see different types of AR objects based on, for example, the time of year or geographic location. For instance, what AR objects a user wants to be able to see in Las Vegas is not necessarily what one wants to be able to see at a family Thanksgiving dinner.

Figure 5:
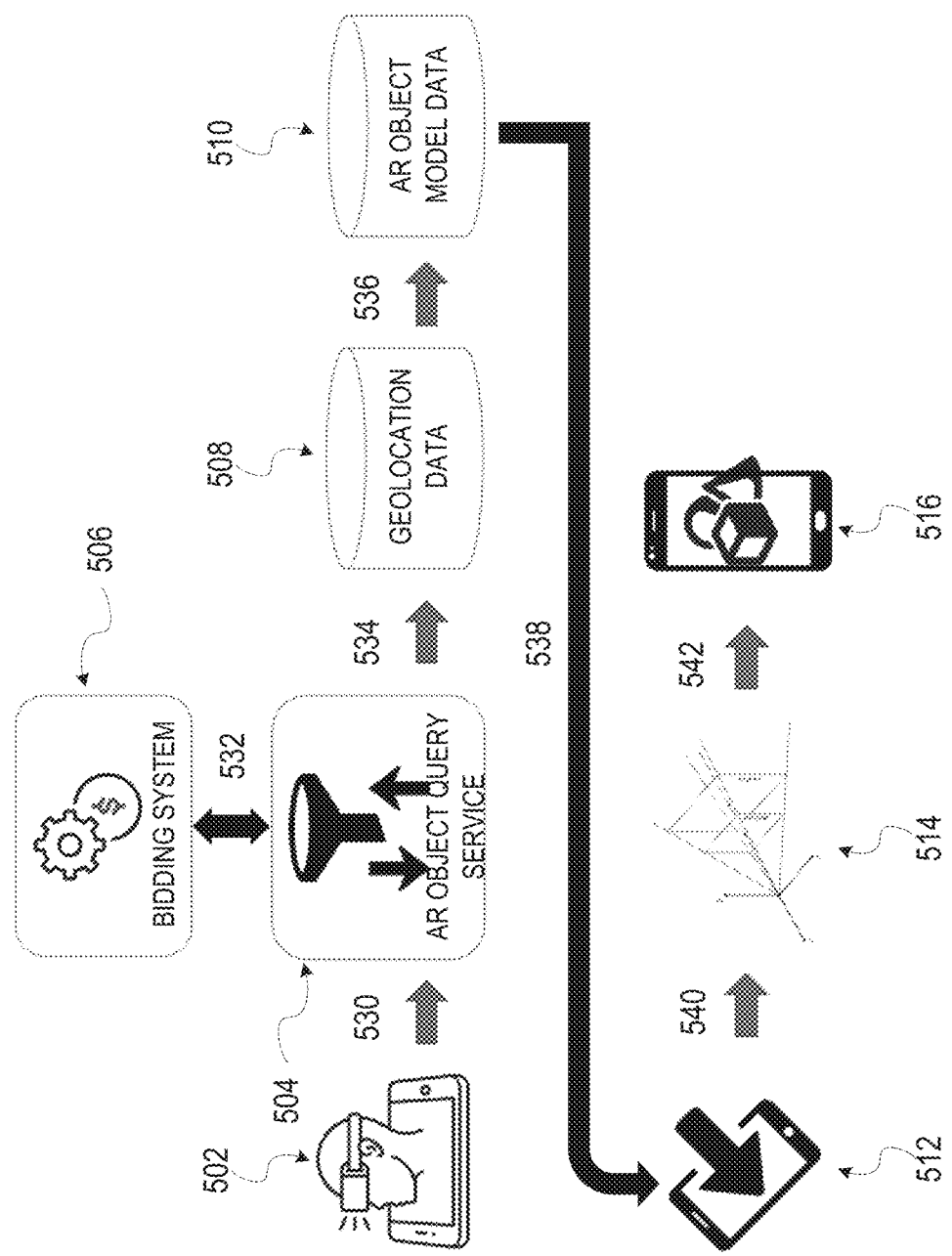
FIG. 5 is a flow diagram illustrate an example of using one or more rankers for providing a client device with one or more AR objects, according to some embodiments.

More regarding operations of the AR object query service 234 are described herein with respect to FIG. 5.

Through the AR object registry service 236, a user can manage (e.g., add, remove, or modify) registration of an AR object in association with one or more coordinates corresponding to a location on a map (e.g., topological map), can manage registration of a ranker in association with one or more coordinates corresponding to a location on a map, or both. For example, a user can use the AR object registry service 236 to generate a new registration of an AR object with respect to one or more coordinates corresponding to a location on a map. The new registration can be for an AR object newly added to the AR object model data layer 218 or already stored on the AR object model data layer 218. As described herein, registering an AR object in association with a set of coordinates can effectively place the AR object at a location corresponding to the set of coordinates (e.g., place the AR object relative to a real-world map to achieve mixed reality). Depending on the embodiment, a registration of AR object or a ranker can be ephemeral.

For some embodiments, the AR object registry service 236 uses permission data to determine whether a given user can register a given AR object, a given ranker, or both with respect to one or more coordinates on a map. For example, as described herein, zone data from the logical topological data layer 214 can provide permission data in association with one or more areas of a real-world environment (e.g., marked areas described by the zone data). Additionally, for some embodiments, the AR object registry service 236 implements one or more rate limitations with respect to registration requests (e.g., request for adding, removing, or updating registrations). For example, a rate limitation can define that a given user is limited to five registrations per a day through the AR object registry service 236. In another example, a rate limitation can define that a given user is limited to a predetermined number of registrations per a day, and the given user has to pay to register more than the predetermined number within a day. With a rate limitation, some embodiments can avoid spamming the AR object registry service 236 with registration requests.

Depending on the embodiment, the AR object registry service 236 can permit or facilitate registration of an AR object, a ranker, or both by the public domain (e.g., public registration). For instance, a user (e.g., from the public) can construct a new AR object or a new ranker and register this new item via the AR object registry service 236.

For some embodiments, the AR object registry service 236 stores a registration of an AR object (with respect to a set of coordinates corresponding to a location on a map) in the geolocation data of the logical topological data layer 214 as described herein (e.g., using model_id of TABLE 2). Similarly, for some embodiments, the AR object registry service 236 stores a registration of a ranker (e.g., with respect to a set of coordinates corresponding to a location on a map) as geolocation data of the logical topological data layer 214 as described herein (e.g., using ranker_id of TABLE 2). Some embodiments can facilitate registration of an AR object or a ranker in connection with an attribute of a client device (e.g., identity of a particular client device, a client device type, version of operating system, etc.) or an attribute of client application (e.g., identity or version of a particular client application or a particular client application type, such as a web browser, social networking, or messaging software application).

FIG. 3 is a block diagram illustrating an example of the AR object interactive session service 232, according to some embodiments. As shown in FIG. 3, the AR object interactive session service 232 comprises one or more mapping servers 302 (e.g., world server), and one or more session servers 304. Depending on the embodiment, a particular mapping server 302 can determine and assign a session (operating on a particular session server 304) to a client device, and a particular session server 304 can operate one or more sessions that support user interactions (e.g., multiuser interactions) with one or more AR objects. According to some embodiments, a client device of a user sends a request to use a session to interact (e.g., facilitate multiuser interaction) with a set of AR objects. The one or more mapping servers 302 can receive the request, determine a particular one of the session servers 304 (hereafter, the determined session server 304) to service the request, assign the user or the client device to a new or an existing session operating on the determined session server 304 that can service the request, and re-route or otherwise re-direct the client device to the determined session server 304. Depending on the embodiment, the mapping server 302 can determine which of the session servers 304 is to service a given request based on, for example, the set of coordinates of the client device, identity of the user, current load of session servers, association of session servers 304 to marked areas (e.g., geopartitioning) of the real-world environment. For instance, the mapping server 302 can determine which of the session servers 304 is to service a given request such that multiple simultaneous users interacting with the same set of AR objects are partitioned in a way that does not overload any one of the session servers 304, while maintaining preferential user groupings in sessions (e.g., placing users that are friends together in the same session).

A given session server 304 can operate a plurality of simultaneous sessions (e.g., based on its particular load or capacity). As described herein, a given session maintains its own session state for each of AR object involved in the given session, and those session states are maintained not accessible outside of the given session. A given session server 304 can operate a virtual, canonical copy of a session. Once multiple client devices of users participating in a given session (operating on a given session server 304) have established a data connection with the given session, each client device can communicate data, such as a user inputs (e.g., swipes, head tilts, etc.) or session state updates to AR objects, to the given session, and the given session can share the data with the other client devices connected to the given session. A client device can share data with the given session using, for example, a low latency. User Datagram Protocol (UDP)-based connection. Upon receiving user inputs from a client device, the given session can validate the user inputs (e.g., to deter or avoid bots or cheaters) and can share the validated user input to all other client devices (e.g., using the same low latency. UDP-based connection) so the client devices can update their local copies of session states of AR objects based on the validated user inputs accordingly. The given session can also update some session information based on the validated user inputs.

FIG. 4 is a flow diagram illustrating an example of session handling by an AR object interactive session service (e.g., 232), according to some embodiments. At the start, a client application operating on a client device 404 can cause the client device 404 to request/query for one or more AR objects from an AR object query service 402 (e.g., request/query based on a set of coordinates corresponding to the current location of the client device 404 and a radius value). At operation 420, the client device 404 can download data for the one or more AR objects that result from the request/query, which can include model data and rule data for the one or more AR objects. Subsequently, the user can interact with the one or more AR objects in accordance with one or more rules described by the rule data. Eventually, the user may request a session to facilitate multiuser interaction with respect to at least one of the one or more AR objects. Accordingly, at operation 422, the client device 404 can initialize a connection with a mapping server 406 (e.g., world server), which can enable the client device 404 to send its request for a session. In response to the request, at operation 424, the mapping server 406 can check an AR object interactive session cache 410 to determine whether there are any existing sessions associated with the at least one AR object (to which the client device 404 can be assigned), or whether a new session needs to be created for the request. In FIG. 4, the AR object interactive session cache 410 can cache information regarding sessions currently being operated by one or more session servers. Accordingly, a session server such as session server 408 can periodically update information stored on AR object interactive session cache 410 (as represented by operation 428). After the mapping server 406 identifies and assigns the client device 404 to a new or existing session, at operation 426, the mapping server 406 can redirect the client device 404 to the session server operating the assigned session (representing by the session server 408). Once redirected to the session server 408 and a data connection with the assigned session is established, at operation 430, the client device can send its user's inputs to the assigned session (to be shared by the assigned session with other client devices connected to the assigned session), and the client device can receive user inputs from client devices of other users participating in the assigned session. Based on the received user inputs, the client device 404 can update its local copy of session states for AR objects involved in the assigned session.

FIG. 5 is a flow diagram illustrating an example of using one or more rankers for providing a client device with one or more AR objects, according to some embodiments. At the start, a client application operating on a client device 502 can cause the client device 502 to request/query for one or more AR objects from an AR object query service 504 (e.g., request/query based on a set of coordinates corresponding to the current location of the client device 404 and a radius value). Operation 530 can represent the client device 502 sending the request/query to the AR object query service 504. The request/query can result from a user of the client device 502 using the client device 502 (e.g., smartphone) to scan their surrounding real-world environment for AR objects.

The AR object query service 504 can determine one or more rankers associated with the received request/query (e.g., based on a set of coordinates provided by the request/query). One of the determined rankers can be one that accesses bidding data from a bidding system 506 at operation 532 and prioritizes one or more AR objects over other AR objects. As described herein, the bidding system 506 can enable a user to bid on prioritizing (e.g., boosting the priority of) a registered AR object. At operation 534, the AR object query service 504 can query geolocation data 508 to determine an intermediate set of AR objects associated with coordinates within a radius of the client device 502's current geographic location, and then apply the one or more determined rankers to the intermediate set of AR objects (e.g., filter or sort the intermediate set of AR objects) to reach a final set of AR objects. At operation 536, the AR object query service 504 can obtain (e.g., fetch) data for the final set of AR objects, which can include, for example, data from AR object model data 510 and rule data associated with the final set of AR objects. At operation 538, the data for the final set of AR objects is provided to and downloaded by the client device 502 (as represented by 512). At operation 540, the client device 502 can determine positioning of a virtual camera with respect to a display of the client device 502 (as represented by 514) and, at operation 542, the client device 502 can display rendered models of one or more of the AR objects from the final set based on the positioned virtual camera (as represented by 516). Subsequently, the user of the client device 502 can interact with the AR objects displayed on the client device 502.

Figure 6:
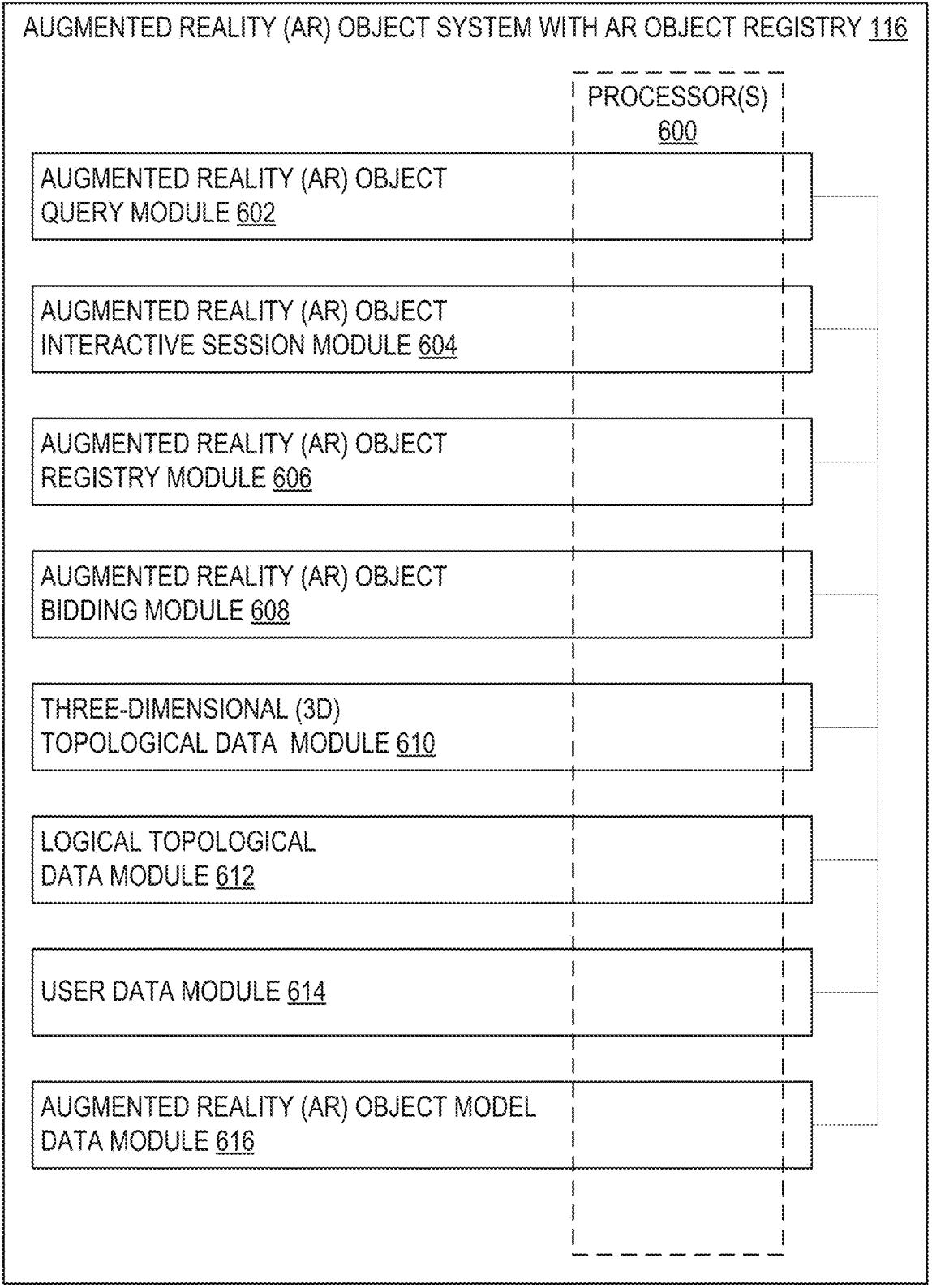
FIG. 6 is a block diagram illustrating an example implementation of an AR object system, according to some embodiments.

FIG. 6 is a block diagram illustrating an example implementation of the AR object system 116, according to some embodiments. The AR object system 116 is shown as including an augmented reality (AR) object query module 602, an augmented reality (AR) object interactive session module 604, an augmented reality (AR) object registry module 606, an augmented reality (AR) object bidding module 608, a three-dimensional (3D) topological data module 610, a logical topological data module 612, a user data module 614, and an augmented reality (AR) object model data module 616. The various modules of the AR object system 116 are configured to communicate with each other (e.g., via a bus, shared memory, or a switch). Any one or more of these modules may be implemented using one or more processors 600 (e.g., by configuring such one or more processors 600 to perform functions described for that module) and hence may include one or more of the processors 600.

Any one or more of the modules described may be implemented using hardware alone (e.g., one or more of the computer processors of a machine, such as machine 1500) or a combination of hardware and software. For example, any described module of the AR object system 116 may physically include an arrangement of one or more of the processors 600 (e.g., a subset of or among the one or more processors of the machine, such the machine 1500) configured to perform the operations described herein for that module. As another example, any module of the AR object system 116 may include software, hardware, or both, that configure an arrangement of one or more processors 600 (e.g., among the one or more processors of the machine, such as the machine 1500)) to perform the operations described herein for that module. Accordingly, different modules of the AR object system 116 may include and configure different arrangements of such processors 600 or a single arrangement of such processors 600 at different points in time. Moreover, any two or more modules of the AR object system 116 may be combined into a single module, and the functions described herein for a single module may be subdivided among multiple modules. Furthermore, according to various embodiments, modules described herein as being implemented within a single machine, database, or device may be distributed across multiple machines, databases, or devices.

The AR object query module 602 to facilitate or implement aspects, features, or functionalities of the AR object query service 234 described herein with respect to FIG. 2. The AR object interactive session module 604 to facilitate or implement aspects, features, or functionalities of the AR object interactive session service 232 described herein with respect to FIG. 2. The AR object registry module 606 to facilitate or implement aspects, features, or functionalities of the AR object registry service 236 described herein with respect to FIG. 2. For some embodiments, the AR object registry module 606 also supports registration of a ranker as described herein. The AR object bidding module 608 to facilitate or implement aspects, features, or functionalities of a bidding system described herein with respect to the AR object query service 234 of FIG. 2. The 3D topological data module 610 to facilitate or implement aspects, features, or functionalities with respect to the 3D topological data layer 212 described herein with respect to FIG. 2. The logical topological data module 612 to facilitate or implement aspects, features, or functionalities with respect to the logical topological data layer 214 described herein with respect to FIG. 2. The user data module 614 to facilitate or implement aspects, features, or functionalities of the user data layer 216 described herein with respect to FIG. 2. The AR object model data module 616 to facilitate or implement aspects, features, or functionalities of the AR object model data layer 218 described herein with respect to FIG. 2.

For some embodiments, a set of world servers and a set of session servers used to implement or operate the AR object interactive session module 604. Additionally, for some embodiments, the AR object query module 602 is implemented or operates on a set of query servers that are separate from the set of world servers and the set of session servers used to operate the AR object interactive session module 604. More regarding modules 602-616 is described below with respect to operations of the methods depicted by FIGS. 7-13.

FIGS. 7 through 13 are flowcharts illustrating methods relating to an AR object registry, according to some embodiments. Various methods described herein with respect to FIGS. 7 through 13 may be embodied in machine-readable instructions for execution by one or more computer processors such that the operations of the methods may be performed in part or in whole by the server system 108 or, more specifically, the AR object system 116. Accordingly, various methods are described herein by way of example with reference to the AR object system 116. At least some of the operations of the method 800 may be deployed on various other hardware configurations, and the methods described herein are not intended to be limited to being operated by the server system 108. Though the steps of the methods described herein may be depicted and described in a certain order, the order in which the operations are performed may vary between embodiments. For example, an operation may be performed before, after, or concurrently with another operation. Additionally, the components described with respect to the methods are merely examples of components that may be used with the methods, and other components may also be utilized, in some embodiments.

Figure 7:
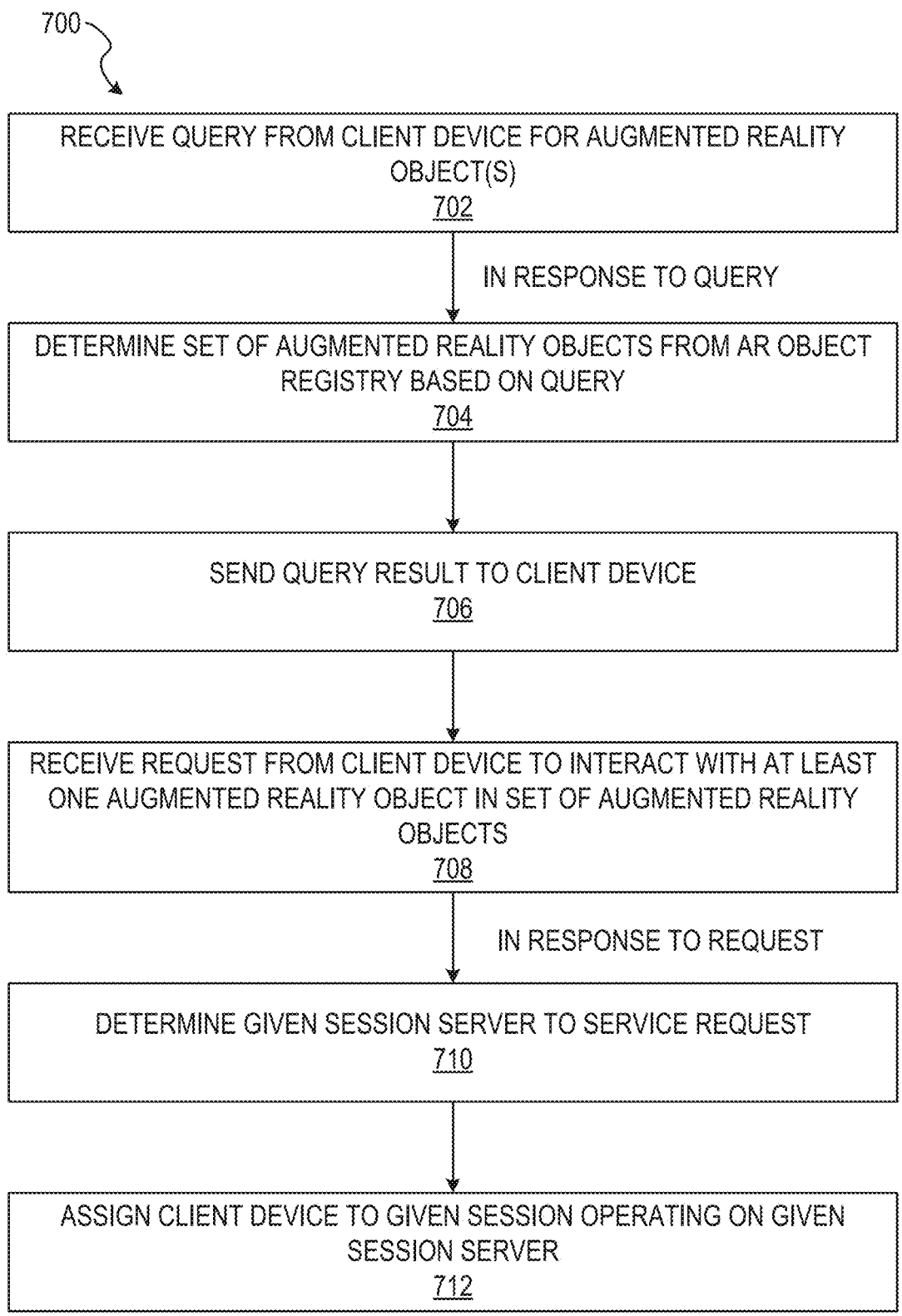
FIGS. 7 through 13 are flowcharts illustrating methods relating to an AR object registry, according to some embodiments.

Referring now to FIG. 7, a method 700 is illustrated for providing AR objects to a client device and handling a session for interacting with a provided AR object. At operation 702, the AR object query module 602 receives a query from a client device for one or more augmented reality objects, where the query can comprise a current set of coordinates that corresponds to a position of the client device on a map, and can further comprise a radius relative to (e.g., centered by a location corresponding to) the current set of coordinates.

In response to the query received at operation 702, at operation 704, the AR object query module 602 determines (e.g., identifies) a set of augmented reality objects based on the query and, at operation 706, sends a query result to the client device, where the query result comprises result data for the set of augmented reality objects determined by operation 704. The determination of the set of augmented reality objects based on the query can comprise the AR object query module 602 executing a search based on the received query. The set of augmented reality objects can be determined by operation 704 from a plurality of augmented reality objects registered on an augmented reality object registry (e.g., as registered via the AR object registry module 606). As described herein, based on the result data provided to the client device by the query result, the client device can display (or surface) one or more of the augmented reality objects from the set of augmented reality objects.

Depending on the embodiment, the result data can comprise a current stored state of the at least one augmented reality object (state stored on the AR object system 116), where the current stored state once provided to the client device can determine an initial state of the at least one augmented reality object for the user on the client device. The result data can comprise model data for each augmented reality object in the set of augmented reality objects. The result data can comprise location (e.g., position) data that describes, for each augmented reality object in the set of augmented reality objects, a given set of coordinates on the map at which the augmented reality object is to be displayed by a given client device when the given client device generates an augmented reality view relative to the given set of coordinates. The result data can comprise orientation data that describes, for each augmented reality object in the set of augmented reality objects, a given orientation at which a given client device is to display the augmented reality object when the client device generates an augmented reality view that includes the augmented reality object. Additionally, the result data can comprise rule data that describes a set of interaction rules associated with the set of augmented reality objects, where the set of interaction rules can determine interactions available to the user (on the first client device) with respect to the set of augmented reality objects. The augmented reality registry of the AR object system 116 can associate a given augmented reality object with one or more interaction rules.

At operation 708, the AR object interactive session module 604 receives, from the client device, a request for a user at the client device to interact with at least one augmented reality object in the set of augmented reality objects (determined at operation 704 and for which the query result was sent to the client device at operation 706).

In response to the request received at operation 708, at operation 710, the AR object interactive session module 604 determines (e.g., identifies) a given session server to service the request received at operation 708 and, at operation 712, assigns the client device to a given session operating on the given session server. The given session can be a new session created by the given session in response to the request, or an existing session that involves the same set of AR objects associated with the request. For some embodiments, the AR object interactive session module 604 can check a session cache to determine whether a relevant, existing session already exists for the request. The given session server determined at operation 710 can be associated with a geographic partition of the map that contains the position of the client device on the map. As described herein, the given session can facilitate interaction with the at least one augmented reality object by the user of the client device. Additionally, as described herein, the given session can maintain a session state for the at least one augmented reality object with respect to one or more users associated with (e.g., participating in) the given session, where the session state can be updated based on interaction of at least one of the users with the at least one augmented reality object. The given session server can be determined from a plurality of given session servers (e.g., 304), a mapping server (e.g., 302) can perform the determination of the given session server. For some embodiments, the plurality of session servers operates on a first set of computer devices that is separate from a second set of computer devices operating the mapping server. For some embodiments, assigning the first client device to the given session operating on the given session server comprises redirecting the client device from the mapping server to the given session server. Once the given session is assigned to the user, the user data can be updated via the user data module 614. Subsequent to the assignment, a network connection can be established between the client device and the (assigned) given session on the given session server.

Figure 8:
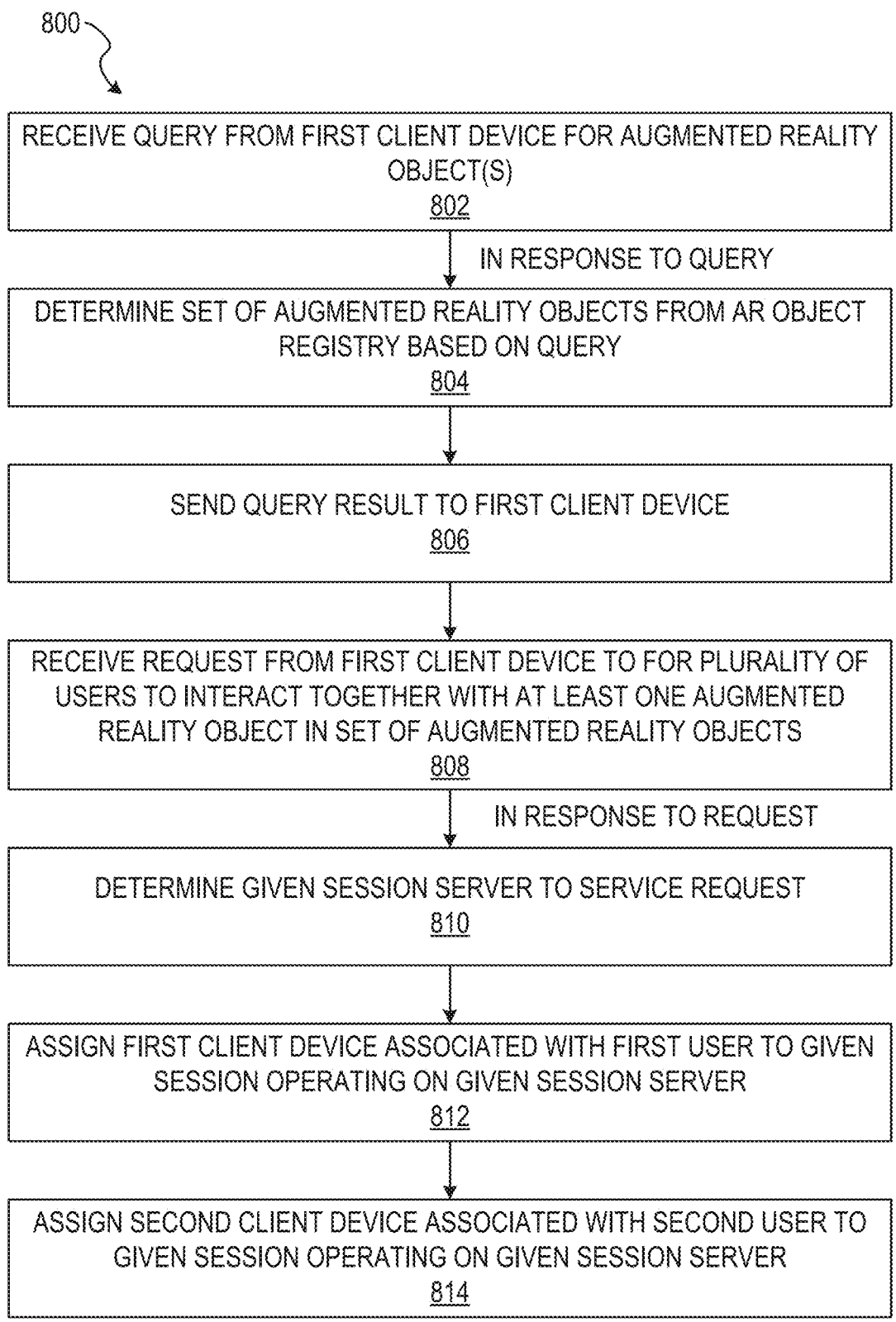

Referring now to FIG. 8, a method 800 is illustrated for providing AR objects to a client device and handling a session for a plurality of users to interact with a provided AR object. For some embodiments, operations 802 through 806 are respectively similar to operation 702 through 706 of the method 700 described above with respect to FIG. 7, and performed with respect to a first client device (associated with a first user). At operation 808, the AR object interactive session module 604 receives, from the first client device, a request for a plurality of users to interact together (e.g., multiuser interactive session) with at least one augmented reality object in the set of augmented reality objects (determined at operation 804 and for which the query result was sent to the first client device at operation 806). As described herein, a multiuser interactive session can facilitate interaction by a plurality of users with the at least one augmented reality object.

In response to the request received at operation 808, at operation 810, the AR object interactive session module 604 determines (e.g., identifies) a given session server to service the request received at operation 808 and, at operation 812, assigns the first client device to a given session operating on the given session server. As described herein, the given session server determined at operation 810 can be associated with a geographic partition of the map that contains the position of the first client device on the map. Additionally, at operation 814, the AR object interactive session module 604 assigns a second client device associated with a second user to the same given session operating on the same given session server (determined at operation 810), where the first user of the first client device and the second user of the second client device are part of the plurality of users for which session request was received at operation 808. Additionally, other users of the plurality of users can be assigned to the same given session on the same given session server in a similar manner.

Figure 9:
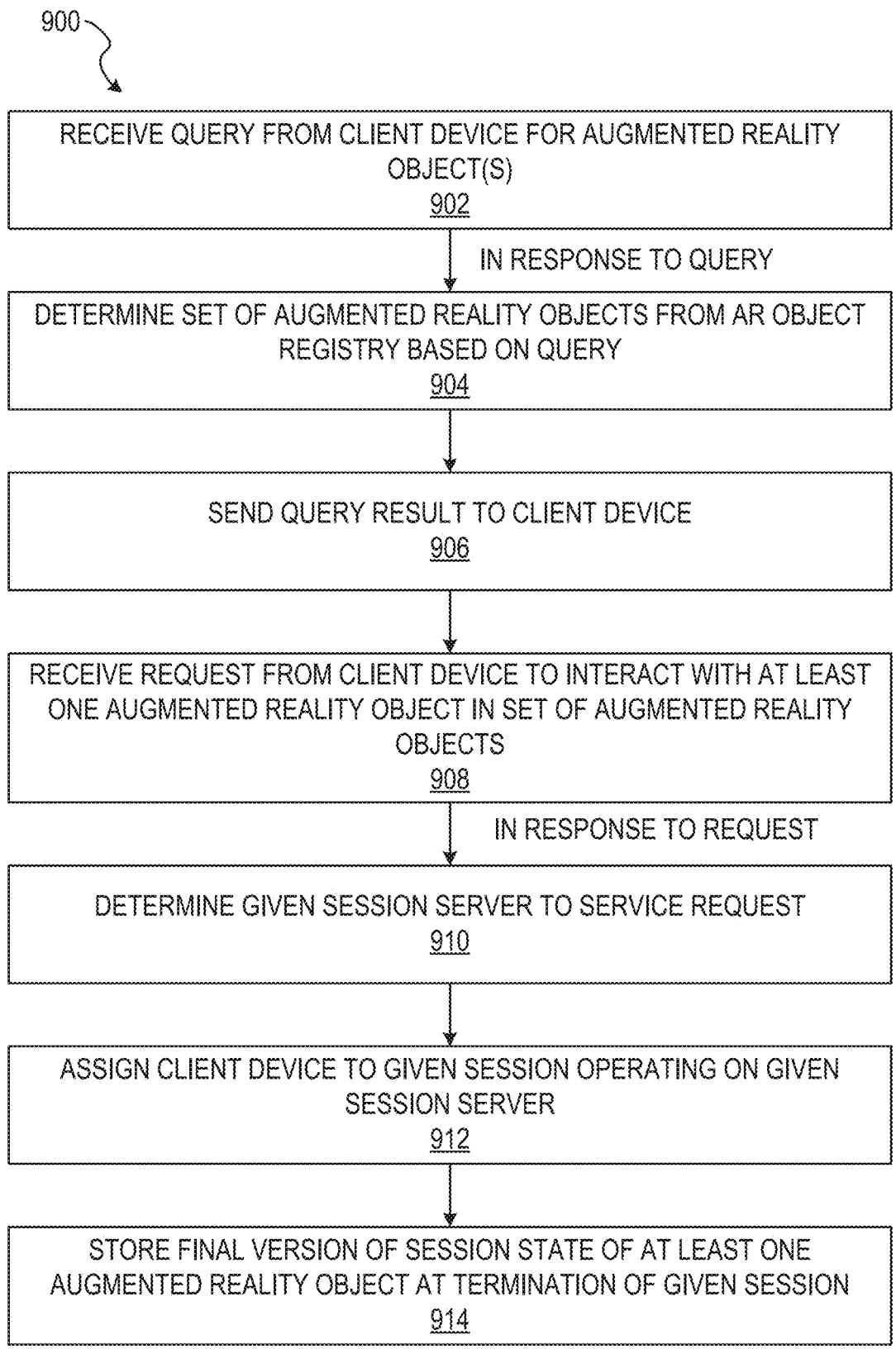

Referring now to FIG. 9, a method 900 is illustrated for providing AR objects to a client device and handling a session for interacting with a provided AR object. For some embodiments, operations 902 through 912 are similar to operation 702 through 712 of the method 700 described above with respect to FIG. 7. At operation 914, at termination of the given session, the AR object interactive session module 604 stores (or causes the storage) of a final version of a session state of the at least one augmented reality object. As described herein, the final version of a session state of a given augmented reality object can be determined (e.g., adjusted) by interactions of users participating in the given session.

Figure 10:
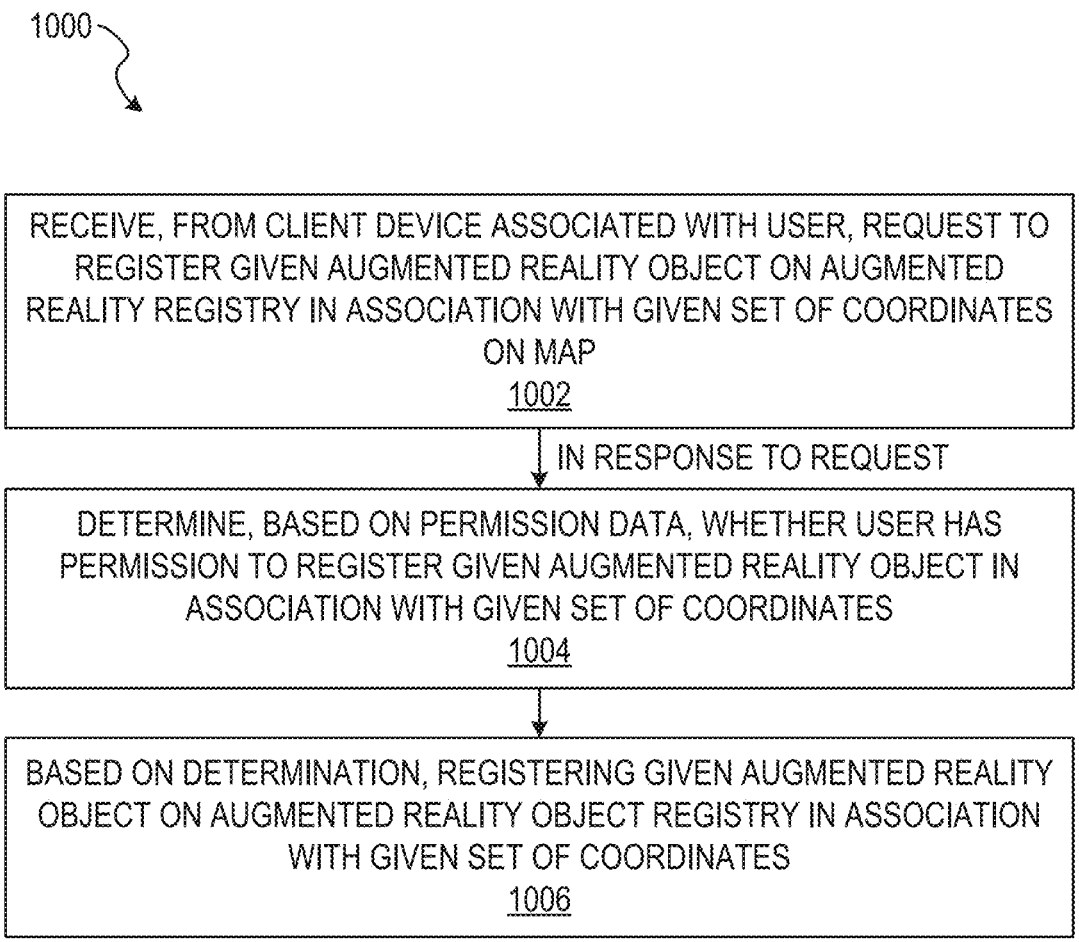

Referring now to FIG. 10, a method 1000 is illustrated for registering an AR object to an AR object registry. At operation 1002, the AR object registry module 606 receives, from a client device associated with a user, a request to register a given augmented reality object on an augmented reality object registry in association with a given set of coordinates on the map.

In response to the request received at operation 1002, at operation 1004, the AR object registry module 606 determines, based on permission data, whether the user has permission to register the given augmented reality object in association with the given set of coordinates on the map. For some embodiments, the permission data describes an association between at least one set of coordinates on the map and a set of permissions. The permission data can be associated with a marked area of the map that contains the given set of coordinates. Accordingly, for some embodiments, the permission data can be provided by zone data accessible through the logical topological data module 612.

Additionally, in response to the request received at operation 1002, operation 1006 is performed. At operation 1006, based on the determining whether the user has permission, the AR object registry module 606 registers the given augmented reality object on the augmented reality object registry in association with the given set of coordinates on the map. When doing so, the AR object registry module 606 can designate the user as the owner or controller of the registration.

Figure 11:
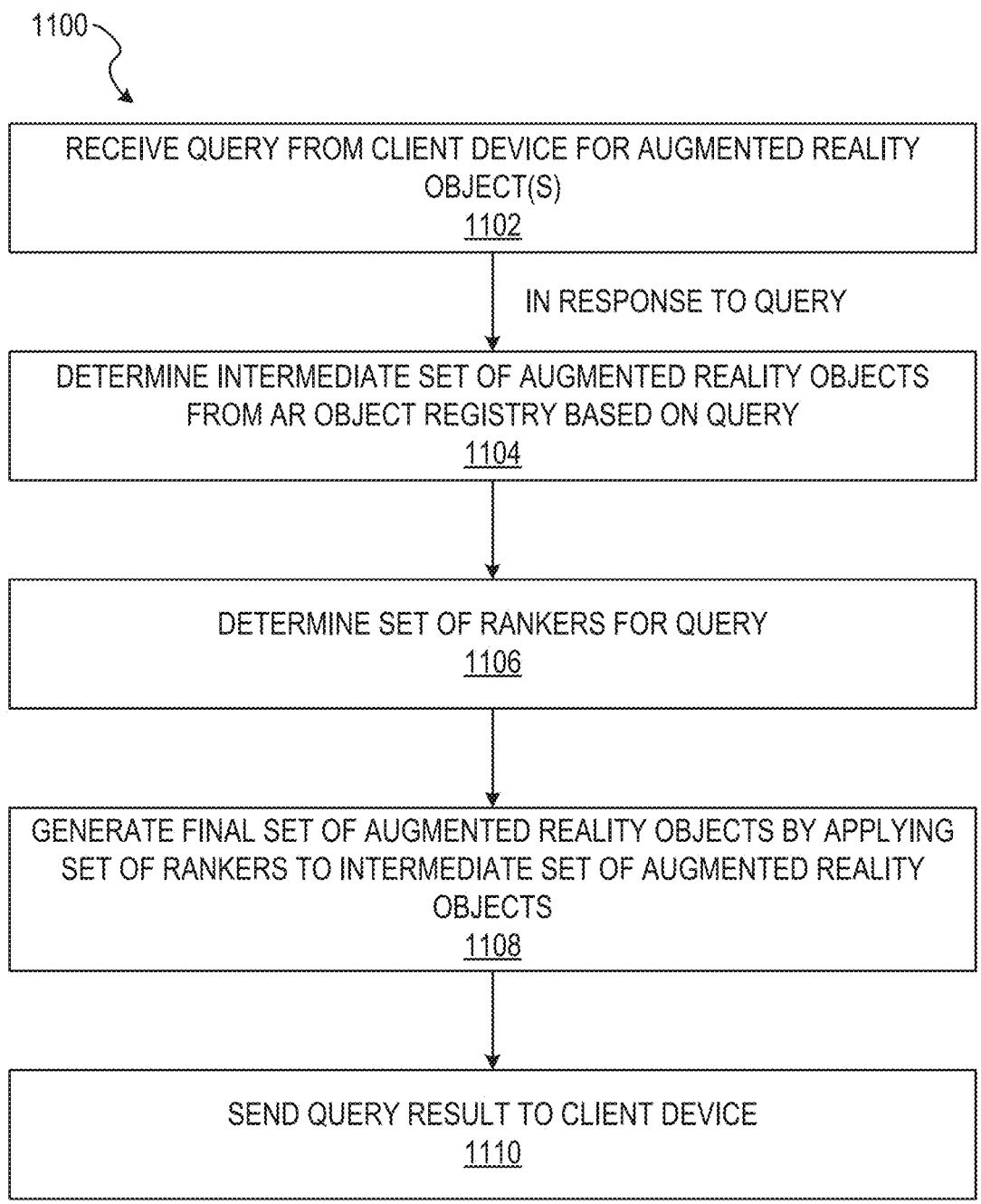

Referring now to FIG. 11, a method 1100 is illustrated for providing AR objects to a client device based on one or more rankers. At operation 1102, the AR object query module 602 receives a query from a client device for one or more augmented reality objects, where the query can comprise a current set of coordinates that corresponds to a position of the client device on a map, and can further comprise a radius relative to (e.g., centered by a location corresponding to) the current set of coordinates.

In response to the query received at operation 1102, at operation 1104, the AR object query module 602: determines (e.g., identifies) an intermediate set of augmented reality objects based on the query; at operation 1106, determining a set of rankers for the query, where at least one ranker in the set of rankers is configured to filter or sort a set of augmented reality objects; and at operation 1108, generates a final set of augmented reality objects by applying the set of rankers (e.g., filtering or sorting according to the rankers) to the intermediate set of augmented reality objects. An example ranker can include one that applies at least one of a filter or a sort order to a set of augmented reality objects.

Another example ranker can include one that filters a set of augmented reality objects based on a set of priorities for the set of augmented reality objects. The priorities can be provided (or determined), for example, by geolocation data (e.g., provided via the logical topological data module 612) or by bidding data (e.g., provided via the AR object bidding module 608) that is associated with one or more of the augmented reality objects. As described herein, a bidding system (e.g., implemented by the AR object bidding module 608) can enable a user to place a bid on an AR object registration to adjust (e.g., boost) the priority of that AR object registration. Through the AR object bidding module 608, a ranker can: request, from a bidding system, priority information for a set of augmented reality objects, and receive, from the bidding system, priority data that describes priorities for at least one of the set of augmented reality objects.

The determination (e.g., identification) of at least one of the rankers can be based on an association of the ranker to the user of the client device (e.g., user selected use of the ranker or registered by the user). The determination of at least one of the rankers can be based on the current set of coordinates corresponding to the location of the client device. In doing so, a ranker can be applied to a radius around the client device. The determination of at least one of the rankers can be based on an attribute of a client device, such as the identity of the client device or a device type of the client device. The determination of at least one of the rankers can be based on at least one of a set (e.g., range) of dates or a set of times. In doing so, a ranker can be applied based on different portions of the years (e.g., according to seasons of the year).

As alternative to operations 1104 through 1108, for some embodiments, in response to the query received at operation 1102, the AR object query module 602: determines a set of rankers for the client query (e.g., where at least one ranker in the set of rankers comprises a filter parameter for filtering a set of augmented reality objects or a sort order parameter for sorting a set of augmented reality objects); and generates (e.g., constructs) a query (a ranker-based query) based on the client query and the set of rankers; and then determines (e.g., identifies) a final set of augmented reality objects based on the ranker-based query.

At operation 1110, the AR object query module 602 sends a query result to the client device, where the query result comprises result data for the final set of augmented reality objects (e.g., the final set as determined by operation 1108 or the alternative approach). As described herein, the result data for the final set of augmented reality objects can comprise various types of data (e.g., location data, model data, orientation data, etc.) for one or more of the augmented reality objects in the final set.

Figure 12:
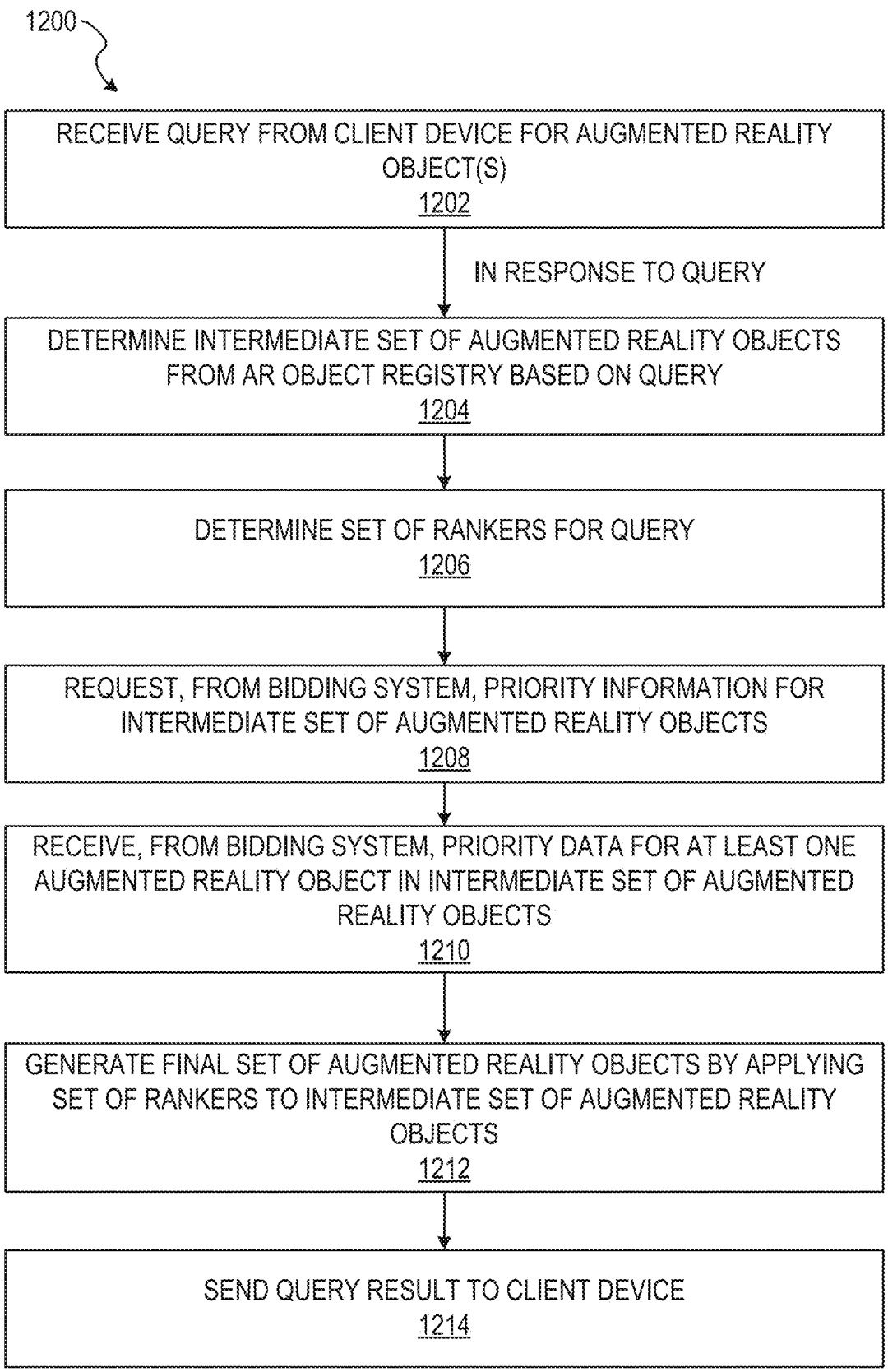

Referring now to FIG. 12, a method 1200 is illustrated for providing AR objects to a client device based on one or more rankers involving a bidding system. For some embodiments, operations 1202 through 1206 are respectively similar to operation 1102 through 1106 of the method 1100 described above with respect to FIG. 11. At operation 1208, the AR object query module 602 requests, from a bidding system (via the AR object bidding module 608), priority information for the intermediate set of augmented reality objects determined at operation 1204. For some embodiments, operation 1208 is performed based on at least one of the rankers determined at operation 1206 (e.g., the ranker uses priority information of augmented reality objects to filter or sort them). At operation 1210, the AR object query module 602 receives, from the bidding system, priority data (or bidding data) that describes a priority for at least one augmented reality object in the intermediate set of augmented reality objects.

For some embodiments, operations 1212 and 1214 are respectively similar to operation 1108 and 1110 of the method 1100 described above with respect to FIG. 11. As described herein, the priority information obtained via operations 1208 and 1210 can enable a ranker applied to the intermediate set of augmented reality objects (by operation 1212) to filter or sort the intermediate set of augmented reality objects.

Figure 13:
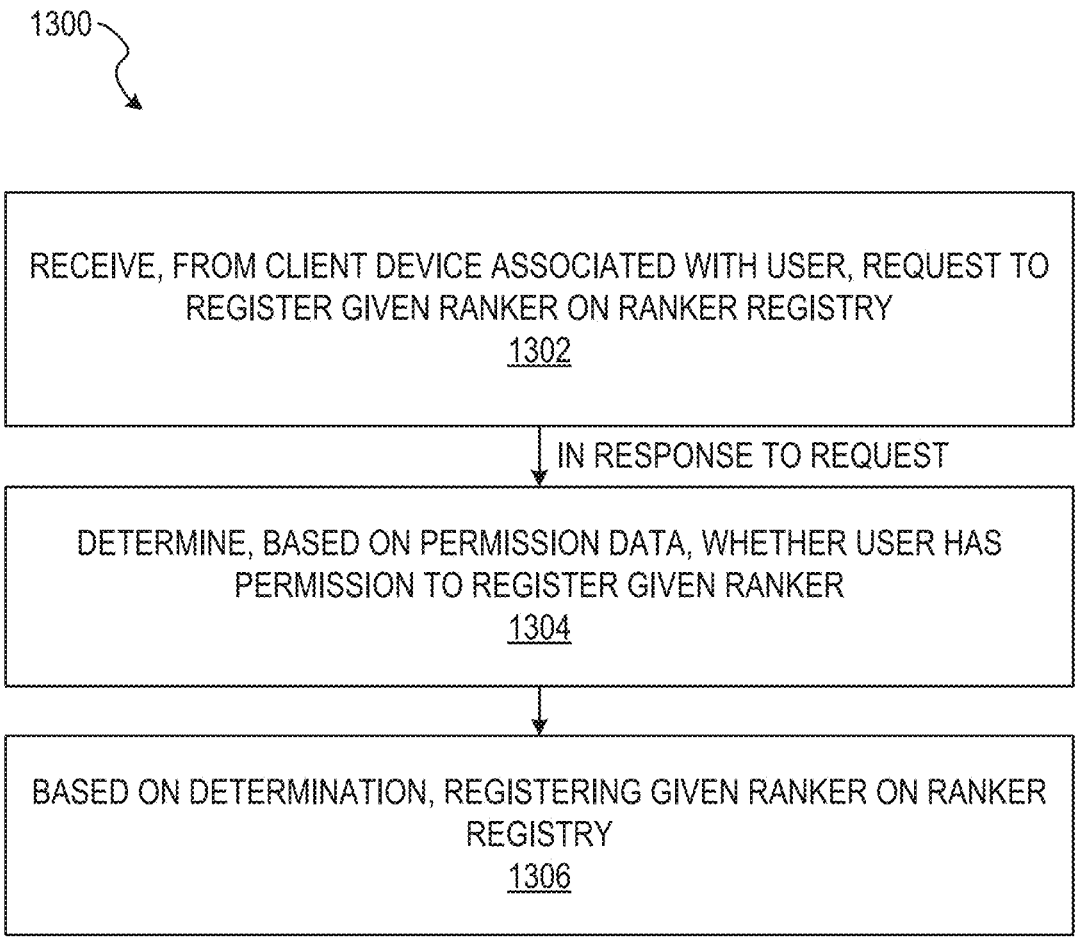

Referring now to FIG. 13, a method 1300 is illustrated for registering a ranker to a ranker registry (which may be implemented as part of the AR object registry). At operation 1302, the AR object registry module 606 receives, from a client device associated with a user, a request to register a given ranker on a ranker registry (e.g., in association with the given set of coordinates on the map, the marked area, with a specific client device, a client device type, user, type of user, time of day, date, season, etc.).

In response to the request received at operation 1302, at operation 1304, the AR object registry module 606 determines, based on permission data, whether the user has permission to register the given ranker. For some embodiments, the permission data describes an association between at least one set of coordinates on the map and a set of permissions. The permission data can be associated with a marked area of the map that contains the given set of coordinates. Accordingly, for some embodiments, the permission data can be provided by zone data accessible through the logical topological data module 612.

Additionally, in response to the request received at operation 1302, operation 1306 is performed. At operation 1306, based on the determining whether the user has permission, the AR object registry module 606 registers the given ranker on the ranker registry (e.g., in association with the given set of coordinates on the map, the marked area, with a specific client device, a client device type, user, type of user, time of day, date, season, etc.). When doing so, the AR object registry module 606 can designate the user as the owner or controller of the registration. The ranker can be registered for use by the user only, or open for use by other users on the AR object system 116.

Figure 14:
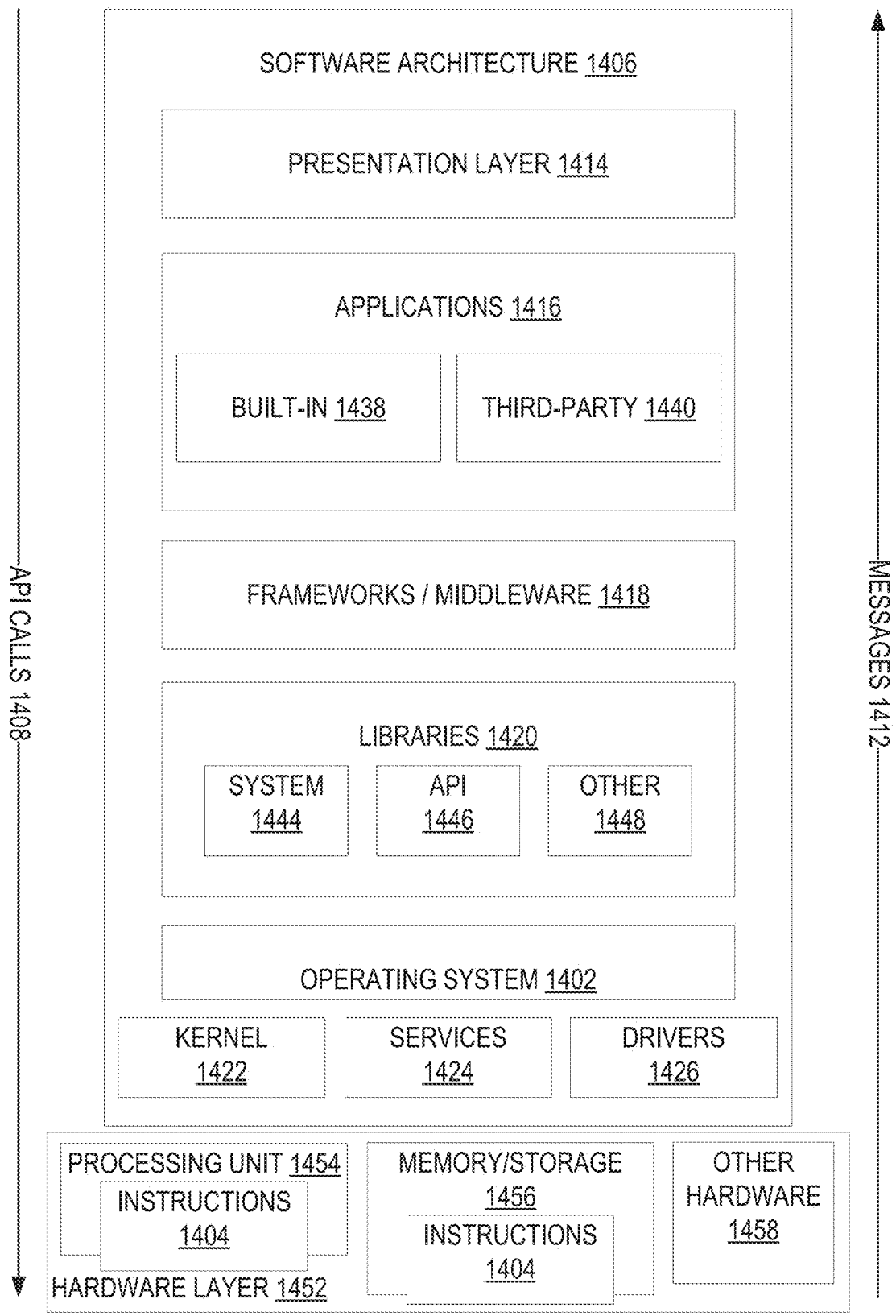
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1406 may execute on hardware such as machine 1500 of FIG. 15 that includes, among other things, processors 1504, memory/storage 1506, and I/O components 1518. A representative hardware layer 1452 is illustrated and can represent, for example, the machine 1500 of FIG. 15. The representative hardware layer 1452 includes a processing unit 1454 having associated executable instructions 1404. Executable instructions 1404 represent the executable instructions of the software architecture 1406, including implementation of the methods, components and so forth described herein. The hardware layer 1452 also includes memory or storage modules memory/storage 1456, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, applications 1416, and a presentation layer 1414. Operationally, the applications 1416 or other components within the layers may invoke application programming interface (API) calls 1408 through the software stack and receive a response in the example form of messages 1412 to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424 and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 or other components or layers. The libraries 1420 provide functionality that allows other software components to perform tasks in an easier fashion than to interface directly with the underlying operating system 1402 functionality (e.g., kernel 1422, services 1424, or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.264. MP3. AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be used by the applications 1416 or other software components/modules, some of which may be specific to a particular operating system 1402 or platform.

The applications 1416 include built-in applications 1438 or third-party applications 1440. Examples of representative built-in applications 1438 may include, but are not limited to, a contacts application, a browser application, a book reader application, a location application, a media application, a messaging application, or a game application. Third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as operating system 1402) to facilitate functionality described herein.

The applications 1416 may use built-in operating system functions (e.g., kernel 1422, services 1424, or drivers 1426), libraries 1420, and frameworks/middleware 1418 to create user interfaces to interact with users of the system. Alternatively, or additionally, in some systems, interactions with a user may occur through a presentation layer, such as presentation layer 1414. In these systems, the application/component "logic" can be separated from the aspects of the application/component that interact with a user.

Figure 15:
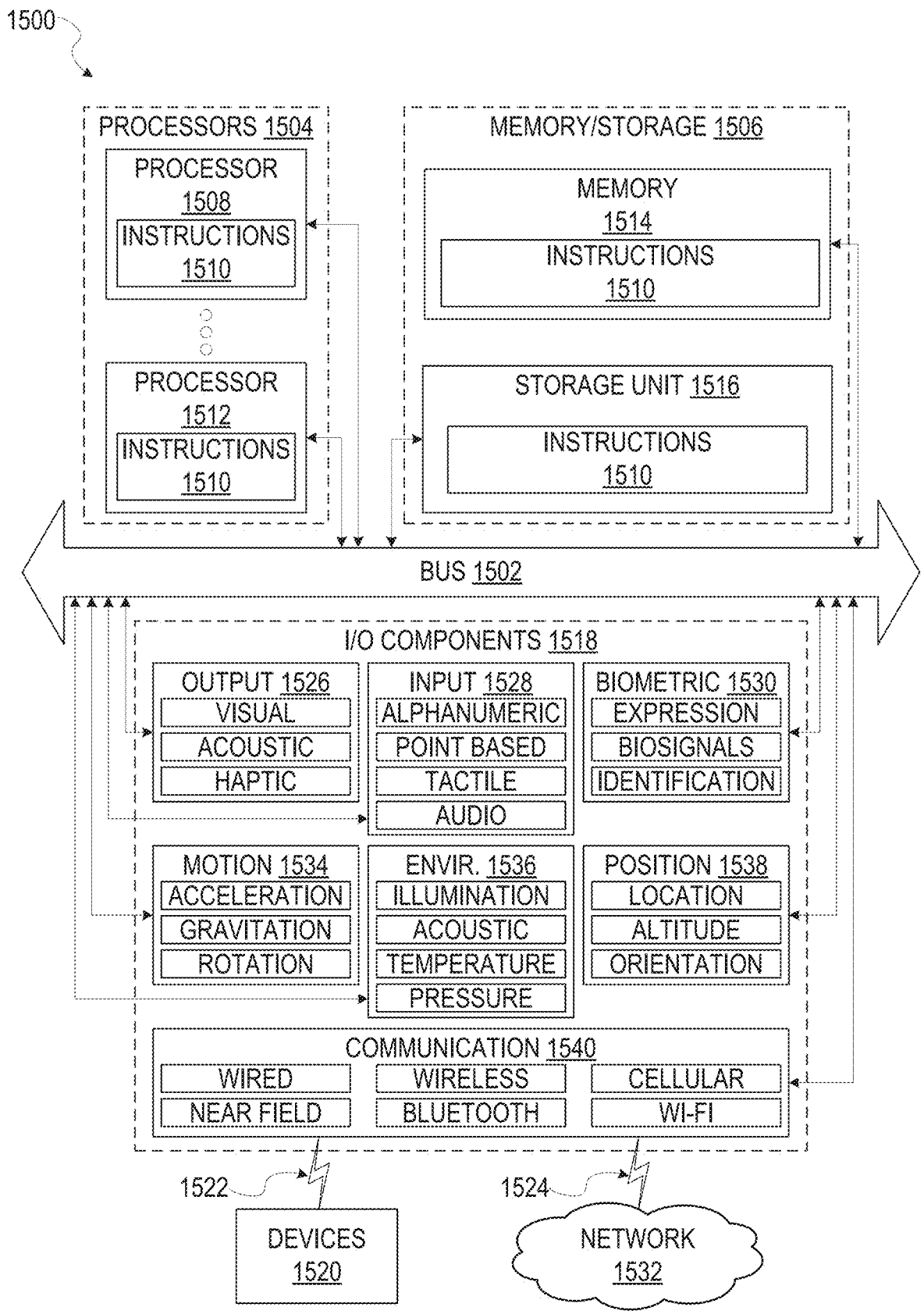
FIG. 15 is a block diagram illustrating components of a machine, according to some embodiments, able to read instructions from a machine-readable medium (e.g., a machine-readable storage medium) and perform any one or more of the methodologies discussed herein.

FIG. 15 is a block diagram illustrating components of a machine 1500, according to some embodiments, able to read instructions from a machine-readable medium (e.g., a computer-readable storage medium) and perform any one or more of the methodologies discussed herein. Specifically. FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further embodiments, the I/O components 1518 may include biometric components 1530, motion components 1534, environment components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via coupling 1522 and coupling 1524 respectively. For example, the communication components 1540 may include a network interface component or other suitable device to interface with the network 1532. In further examples, communication components 1540 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a Universal Serial Bus (USB)).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Glossary

"AUGMENTED REALITY OBJECT" in this context can refer to a virtual object (e.g., two dimension or three dimensional virtual objects) that can be presented in a client device-generated view of a real-world environment (e.g., a view presented on a display of a mobile client device), where the virtual object can interact with or enhance a real-world physical object of the real-world environment presented in the view. For example, using a camera of a smartphone, a user can view their surrounding real-world environment through the smartphone's display and the smartphone can enhance that view by displaying (e.g., superimposing) one or more virtual objects (e.g., three dimensional virtual objects) in the view in connection with one or more particular real-world physical objects of the real-world environment. For instance, an augmented reality object can be combined with a live (e.g., real-time or near real-time) camera feed such that when the augmented reality object is presented, it appears situated in the live a three-dimensional environment (e.g., augmented reality object appears to occupy a consistent three-dimensional volume and dynamically changing in aspect responsive to movement of the camera in a manner similar to that which would have been the case were the AR object a real-world physical object). In addition to visual information, a client device can convey to a user other sensory information in association with a particular augmented reality object, such as auditory information (e.g., music) and haptic information.

"MIXED REALITY" in this context can refer to a merger of real-world environment and a virtual world environment (that can include one or more augmented reality objects) to generate new visualizations through a client device. The new visualizations can enhance one or more real-world physical objects of the real-world environment. The new visualization can create a new mixed reality environment in which real world physical objects and augmented reality objects can coexist and interact with each other in real time. Additionally, within mixed realty, a user can use the client device to interact in real time with the augmented reality objects.

"CLIENT DEVICE" in this context can refer to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context can refer to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL" in this context can describe an item that is accessible for a time-limited duration. An ephemeral item may be an AR object, text, an image, a video and the like. The access time for the ephemeral item may be set by the item owner or originator (e.g., message sender or user registering the AR object). Alternatively, the access time may be a default setting or a setting specified by accessing user (e.g., the recipient or the user attempting to access the registered AR object). Regardless of the setting technique, the ephemeral item is transitory.

"MACHINE-READABLE MEDIUM" in this context can refer to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context can refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some embodiments, the processors or processor-implemented components may be located in a single geographic location (e.g., within a home environment, an office environment, or a server farm). In other embodiments, the processors or processor-implemented components may be distributed across a number of geographic locations.

"PROCESSOR" in this context can refer to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context can refer to a sequence of characters or encoded information identifying when a certain event occurred, for example giving date and time of day, sometimes accurate to a small fraction of a second.

What is claimed is:
1. A method comprising:
  receiving, by a query server, a query from a first client device for one or more augmented reality objects, the query comprising a current set of coordinates that correspond to a position of the first client device on a map;
  in response to the query:

determining, by the query server, a set of augmented reality objects based on the query, the set of augmented reality objects being determined from a plurality of registered augmented reality objects registered on an augmented reality object registry; and sending, by the query server, a query result to the first client device, the query result comprising result data for the set of augmented reality objects;

receiving, from the first client device, a request for a first user at the first client device to interact with at least one augmented reality object in the set of augmented reality objects; and in response to the request:
determining, by a mapping server, a given session server to service the request, the given session server being determined from a plurality of session servers operating on a first set of computer devices, the first set of computer devices being separate from a second set of computer devices operating the mapping server, the given session server being associated with a geographic partition of the map, and the geographic partition containing the position of the first client device on the map; and assigning, by the mapping server, the first client device to a given session operating on the given session server, the given session being for interacting with the at least one augmented reality object.

2. The method of claim 1, wherein the query further comprises a radius relative to the current set of coordinates.

3. The method of claim 1, wherein the result data comprises a current stored state of the at least one augmented reality object, the current stored state determining an initial state of the at least one augmented reality object for the first user on the first client device.

4. The method of claim 1, wherein the given session maintains a session state for the at least one augmented reality object with respect to one or more users associated with the given session, the session state being updated based on interaction of at least one of the one or more users with the at least one augmented reality object.

5. The method of claim 4, wherein the session state is initialized based on a current stored state of the at least one augmented reality object.

6. The method of claim 4, further comprising:
storing, by the given session server, a final version of the session state of the at least one augmented reality object at termination of the given session.

7. The method of claim 1, wherein the request is for a plurality of users to interact together with the at least one augmented reality object, the plurality of users comprising the first user at the first client device and a second user at a second client device, the method further comprising:
further in response to the request:
assigning, by the mapping server, the second client device to the given session operating on the given session server, the given session being for the first user and the second user to interact together with the at least one augmented reality object.

8. The method of claim 1, wherein the assigning the first client device to the given session operating on the given session server comprises redirecting the first client device from the mapping server to the given session server, the method further comprising:
establishing, by the given session server, a network connection between the first client device and the given session on the given session server.

9. The method of claim 1, wherein the result data comprises model data for each augmented reality object in the set of augmented reality objects.

10. The method of claim 1, wherein the result data comprises rule data that describes a set of interaction rules associated with the set of augmented reality objects, the set of interaction rules determining interactions available to the first user, on the first client device, with respect to the set of augmented reality objects.

11. The method of claim 10, wherein the augmented reality object registry associates the set of augmented reality objects with the set of interaction rules.

12. The method of claim 1, wherein the result data comprises location data that describes, for each augmented reality object in the set of augmented reality objects, a given set of coordinates on the map at which the augmented reality object is to be displayed by a given client device when the given client device generates an augmented reality view relative to the given set of coordinates.

13. The method of claim 1, wherein the augmented reality object registry associates each augmented reality object, in the plurality of registered augmented reality objects, with a given set of coordinates on the map at which the augmented reality object is to be displayed by a given client device when the given client device generates an augmented reality view relative to the given set of coordinates.

14. The method of claim 1, wherein the result data comprises orientation data that describes, for each augmented reality object in the set of augmented reality objects, a given orientation at which a given client device is to display the augmented reality object when the given client device generates an augmented reality view that includes the augmented reality object.

15. The method of claim 1, wherein the augmented reality object registry associates each augmented reality object, in the plurality of registered augmented reality objects, with a given orientation at which a given client device is to display the augmented reality object when the given client device generates an augmented reality view that includes the augmented reality object.

16. The method of claim 1, further comprising:
receiving, from a second client device associated with a second user, a request to register a given augmented reality object on the augmented reality object registry in association with a given set of coordinates on the map;

determining, based on permission data, whether the second user has permission to register the given augmented reality object in association with the given set of coordinates on the map, the permission data describing an association between at least one set of coordinates on the map and a set of permissions; and based on the determining whether the second user has permission, registering the given augmented reality object on the augmented reality object registry in association with the given set of coordinate.

17. The method of claim 16, wherein the permission data is associated with a marked area of the map that contains the given set of coordinates.

18. A non-transitory machine-readable medium storing instructions that, when executed by one or more computer processors of a first set of computing devices, cause the one or more computer processors to perform operations comprising:
receiving a query from a client device for one or more augmented reality objects, the query comprising a current set of coordinates that corresponds to a position of the client device on a map;

in response to the query:
 determining a set of augmented reality objects based on the query, the set of augmented reality objects being determined from a plurality of registered augmented reality objects registered on an augmented reality object registry; and
 sending a query result to the client device, the query result comprising result data for the set of augmented reality objects;

receiving, from the client device, a request for a user at the client device to interact with at least one augmented reality object in the set of augmented reality objects; and in response to the request:
 determining a given session server to service the request, the given session server being determined from a plurality of session servers operating on a second set of computer devices, the first set of computer devices being separate from the first set of computer devices, the given session server being associated with a geographic partition of the map, and the geographic partition containing the position of the client device on the map; and
 assigning the client device to a given session operating on the given session server, the given session being for interacting with the at least one augmented reality object.

19. A system comprising:
a query server to:
 receive a query from a client device for one or more augmented reality objects, the query comprising a current set of coordinates that corresponds to a position of the client device on a map; and
 in response to the query:
  determine a set of augmented reality objects based on the query, the set of augmented reality objects being determined from a plurality of registered augmented reality objects registered on an augmented reality object registry; and
  send a query result to the client device, the query result comprising result data for the set of augmented reality objects;

a plurality of session servers operating on a first set of computing devices, each session server to operate one or more sessions to support user interactions with one or more augmented reality objects; and a mapping server operating on a second set of computing devices that is separate from the first set of computing devices, the mapping server being configured to:
 receive, from the client device, a request for a user at the client device to interact with at least one augmented reality object in the set of augmented reality objects; and
 in response to the request:
  determine, in the plurality of session servers, a given session server to service the request, the given session server being associated with a geographic partition of the map, and the geographic partition containing the position of the client device on the map; and
  assign the client device to a given session operating on the given session server, the given session being for interacting with the at least one augmented reality object.

20. The non-transitory machine-readable medium of claim 18, wherein the assigning the first client device to the given session operating on the given session server comprises redirecting the first client device from the mapping server to the given session server, the operations further comprising:
 establishing, by the given session server, a network connection between the first client device and the given session on the given session server.

* * * * *

UNITED STATES PATENT AND TRADEMARK OFFICE
CERTIFICATE OF CORRECTION

PATENT NO. : 11,343,323 B2
APPLICATION NO. : 16/731821
DATED : May 24, 2022
INVENTOR(S) : Pounds et al.

It is certified that error appears in the above-identified patent and that said Letters Patent is hereby corrected as shown below:

On the Title Page

On page 3, in Column 2, Item (56) under "U.S. Patent Documents", Line 58, delete "2008/0021421" and insert --2008/0214210-- therefor On page 4, in Column 1, Item (56) under "U.S. Patent Documents", Line 2, delete "2009/0008971" and insert --2009/0089710-- therefor On page 6, in Column 1, Item (56) under "Other Publications", Line 13, delete "(IOS/Androld):" and insert --(iOS/Android):-- therefor On page 6, in Column 1, Item (56) under "Other Publications", Line 25, delete "PCT/US2020/06708/," and insert --PCT/US2020/067087,-- therefor On page 6, in Column 1, Item (56) under "Other Publications", Line 33, delete "Belleve-o-Magic"," and insert --Believe-o-Magic",-- therefor In the Claims In Column 35, Line 20, in Claim 18, delete "first" and insert --second-- therefor Signed and Sealed this
Fourteenth Day of February, 2023

Katherine Kelly Vidal
*Director of the United States Patent and Trademark Office*